US011440475B2

(12) United States Patent
Yamamoto et al.

(10) Patent No.: US 11,440,475 B2
(45) Date of Patent: Sep. 13, 2022

(54) PERIPHERY DISPLAY CONTROL DEVICE

(71) Applicant: AISIN CORPORATION, Kariya (JP)

(72) Inventors: Kinji Yamamoto, Kariya (JP); Kazuya Watanabe, Kariya (JP)

(73) Assignee: AISIN CORPORATION, Kariya (JP)

( * ) Notice: Subject to any disclaimer, the term of this patent is extended or adjusted under 35 U.S.C. 154(b) by 310 days.

(21) Appl. No.: 16/751,498

(22) Filed: Jan. 24, 2020

(65) Prior Publication Data

US 2020/0238909 A1 Jul. 30, 2020

(30) Foreign Application Priority Data

Jan. 25, 2019 (JP) .............................. JP2019-011351

(51) Int. Cl.
*B60R 1/00* (2022.01)

(52) U.S. Cl.
CPC .......... *B60R 1/00* (2013.01); *B60R 2300/102* (2013.01); *B60R 2300/105* (2013.01); *B60R 2300/607* (2013.01)

(58) Field of Classification Search
None
See application file for complete search history.

(56) References Cited

U.S. PATENT DOCUMENTS

| 6,898,495 | B2 | 5/2005 | Tanaka et al. |
| 7,161,616 | B1 | 1/2007 | Okamoto et al. |
| 9,321,400 | B2 | 4/2016 | Wakabayashi et al. |
| 2010/0066825 | A1* | 3/2010 | Kuboyama ........... G06T 1/0007 348/118 |
| 2016/0212384 | A1* | 7/2016 | Sawada ..................... B60R 1/00 |
| 2017/0334356 | A1* | 11/2017 | Fujita ..................... G06V 20/58 |
| 2019/0075268 | A1 | 3/2019 | Goto et al. |
| 2019/0113359 | A1* | 4/2019 | Patel ................... G06F 3/04842 |

FOREIGN PATENT DOCUMENTS

| JP | 3300334 B2 | 7/2002 |
| JP | 3947375 B2 | 7/2007 |
| JP | 5522492 B2 | 6/2014 |
| JP | 2017-175182 A | 9/2017 |

* cited by examiner

*Primary Examiner* — Rebecca A Volentine
(74) *Attorney, Agent, or Firm* — Sughrue Mion, PLLC

(57) ABSTRACT

A periphery display control device includes: an image acquisition unit acquiring captured image data obtained by imaging a periphery of an own vehicle; a target acquisition unit acquiring a target position to which the own vehicle moves; an image generation unit generating a virtual viewpoint image while moving, based on a relative angle of the target position with respect to a movement direction of the own vehicle when moving to the target position, at least one of a virtual viewpoint set at a position facing the target position across the own vehicle and a gazing point when facing an area including at least one of the own vehicle and the target position from the virtual viewpoint in a state where a distance between and heights of the virtual viewpoint and the gazing point are maintained; and an output unit outputting the virtual viewpoint image to a display device.

6 Claims, 15 Drawing Sheets

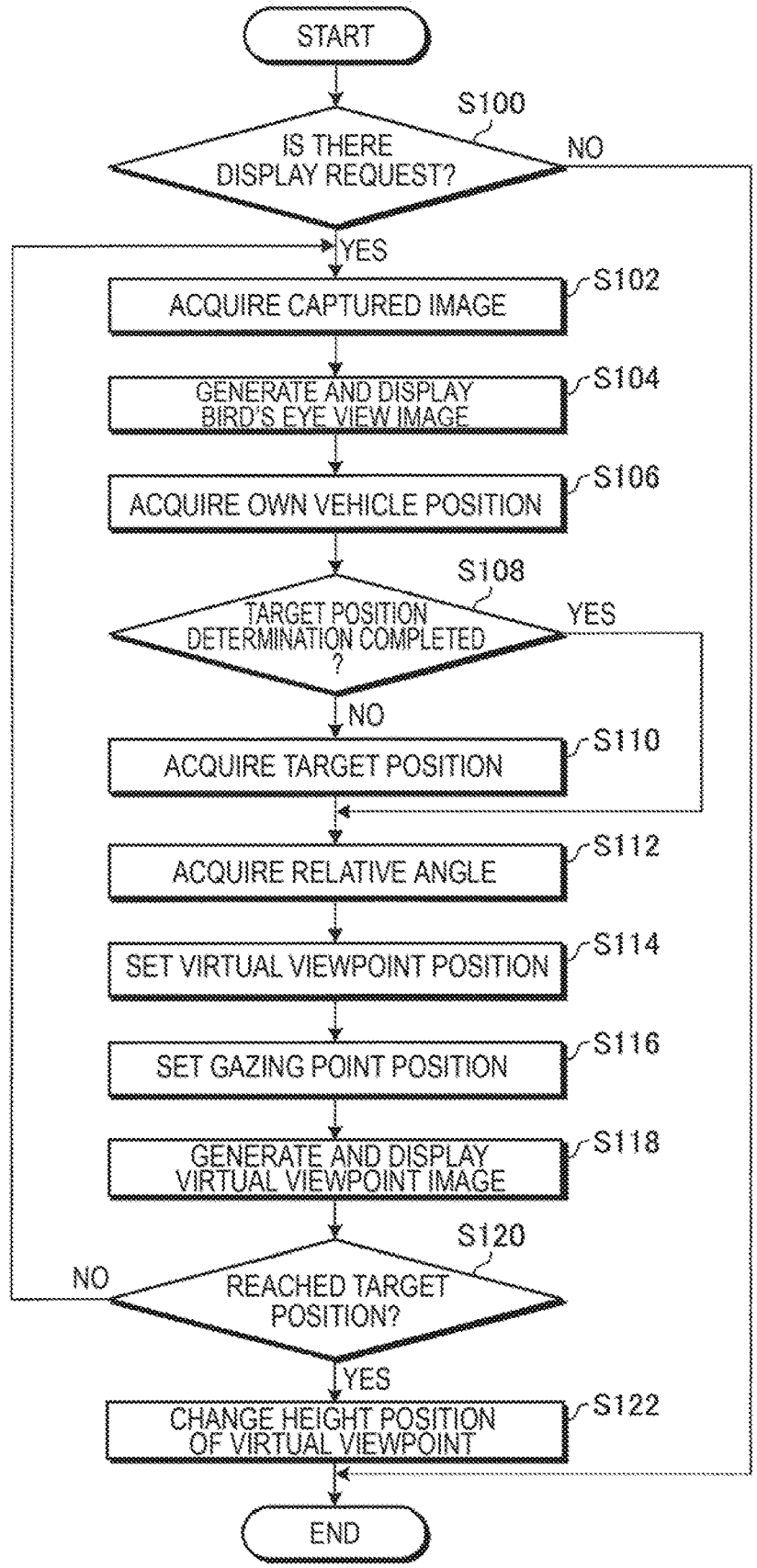

PERIPHERY DISPLAY CONTROL DEVICE

CROSS REFERENCE TO RELATED APPLICATIONS

This application is based on and claims priority under 35 U.S.C. § 119 to Japanese Patent Application 2019-011351 filed on Jan. 25, 2019, the entire contents of which are incorporated herein by reference.

TECHNICAL FIELD

Embodiments of this disclosure relate to a periphery display control device.

BACKGROUND DISCUSSION

In the related art, a technology of capturing images of the situation around a vehicle by multiple imaging units (cameras) provided in the vehicle respectively in different directions, performing an image processing on the captured multiple images, and connecting the respective images to generate, for example, a bird's-eye view image is known. A periphery display control device has been proposed, which displays an own vehicle image (own vehicle image) for indicating the position of an own vehicle (own vehicle image) so as to be overlapped on such a bird's-eye view image, thereby making it easy for a user to grasp the position of the own vehicle with respect to the surrounding situation (e.g., an obstacle and the like). As described above, the bird's-eye view image makes it easy to understand a positional relationship between the own vehicle and an object existing around the own vehicle, but distortion or extension of a three-dimensional object existing around the own vehicle is easily noticeable. Since the own vehicle image is displayed in a well-formed shape, the gap between the own vehicle image and the surrounding three-dimensional object may be large and the bird's eye view image may become an image lacking in reality. Accordingly, a periphery display control device has been proposed, which generates and displays a virtual viewpoint image that reduces distortion or extension of a surrounding three-dimensional object by changing a viewpoint position when displaying a periphery image such that the own vehicle image or the surrounding three-dimensional object is displayed as an image viewed obliquely. Further, a periphery display control device has been proposed, which performs so-called two-screen display in which a bird's-eye view image and a virtual viewpoint image are displayed side by side. See, e.g., JP 3300334B (Reference 1), JP 2017-175182A (Reference 2), and JP 3947375B (Reference 3).

However, when the process in which an own vehicle moves to a target position is displayed with a virtual viewpoint image according to the related art, as the own vehicle approaches the target position, the virtual viewpoint image changes to a bird's eye view image and thus, becomes an image lacking in reality in which distortion or extension of a surrounding three-dimensional object is noticeable as in the bird's eye view image. Further, when two-screen display is performed, since the bird's eye view image and the virtual viewpoint image finally have substantially the same content, the merit of two-screen display is reduced.

Thus, a need exists for a periphery display control device which is not susceptible to the drawback mentioned above.

SUMMARY

A periphery display control device according to an aspect of this disclosure includes, for example, an image acquisition unit configured to acquire captured image data obtained by imaging a periphery of an own vehicle, a target acquisition unit configured to acquire a target position to which the own vehicle moves, an image generation unit configured to generate a virtual viewpoint image while moving, based on a relative angle of the target position with respect to a movement direction of the own vehicle when the own vehicle moves to the target position, at least one of a virtual viewpoint that is set at a position facing the target position across the own vehicle and a gazing point when facing an area including at least one of the own vehicle and the target position from the virtual viewpoint in a state where a distance between the virtual viewpoint and the gazing point is maintained and heights of the virtual viewpoint and the gazing point are maintained, and an output unit configured to output the virtual viewpoint image to a display device.

BRIEF DESCRIPTION OF THE DRAWINGS

The foregoing and additional features and characteristics of this disclosure will become more apparent from the following detailed description considered with the reference to the accompanying drawings, wherein:

FIG. 19 is a flowchart illustrating an example of the flow of an image display processing in the periphery display control device according to the embodiment.

DETAILED DESCRIPTION

Hereinafter, an exemplary embodiment disclosed here will be described. A configuration of the embodiment described later and actions, results, and effects provided by the configuration are given by way of example. This disclosure may be realized by a configuration other than the configuration disclosed in the following embodiment and may obtain at least one of various effects based on a basic configuration and derivative effects.

In the present embodiment, a vehicle 1 in which a periphery display control device is mounted may be, for example, an automobile having an internal combustion engine (not illustrated) as a drive source, i.e., an internal combustion engine automobile, may be an automobile having an electric motor (not illustrated) as a drive source, i.e., an electric automobile or a fuel cell automobile, may be a hybrid automobile having both the internal combustion engine and the electric motor as a drive source, or may be an automobile having any other drive source. Further, the vehicle 1 may be equipped with any of various transmissions, and may be equipped with various devices, e.g., systems and parts, required to drive the internal combustion engine or the electric motor. Further, the type, the number, the layout, and the like of devices related to the driving of wheels 3 in the vehicle 1 may be set in various ways.

Figure 1:
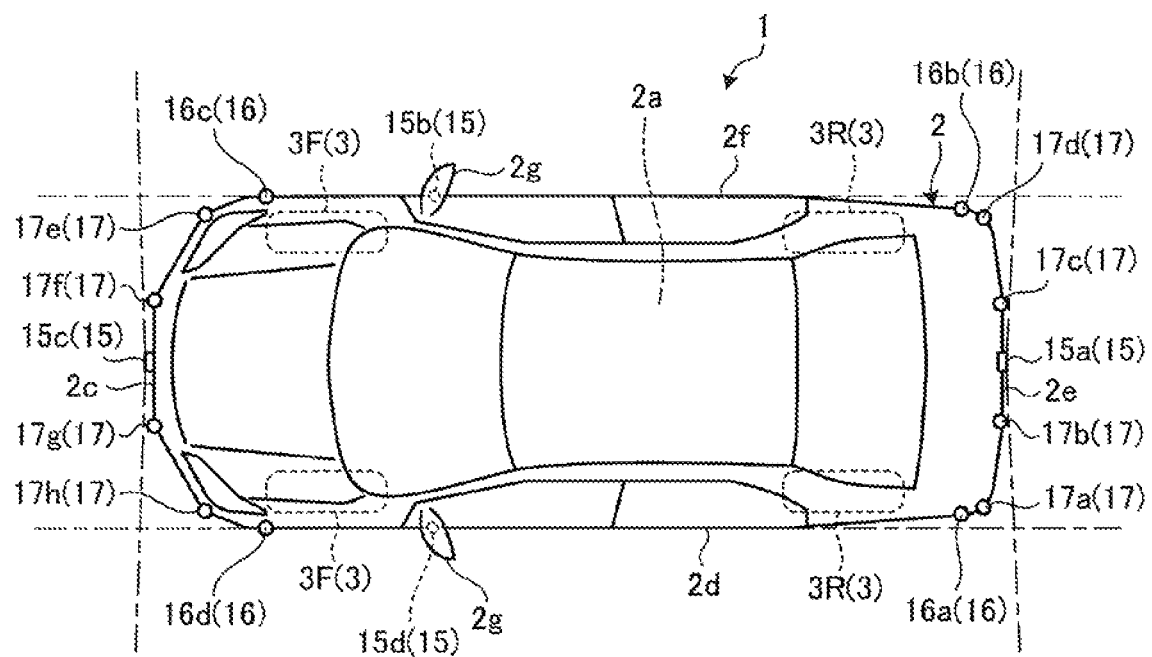
FIG. 1 is an exemplary and schematic top view of a vehicle in which a periphery display control device according to an embodiment may be mounted.

As illustrated in FIG. 1, a vehicle body 2 configures a vehicle room 2a in which an occupant (not illustrated) gets. In the vehicle room 2a, a steering unit, an acceleration operation unit, a braking operation unit, a speed-change operation unit, and the like are provided in a state of facing a seat of a driver as the occupant. The steering unit is, for example, a steering wheel that protrudes from a dashboard, the acceleration operation unit is, for example, an accelerator pedal that is positioned under the driver's feet, the braking operation unit is, for example, a brake pedal that is positioned under the driver's feet, and the speed-change operation unit is, for example, a shift lever that protrudes from a center console.

Figure 2:
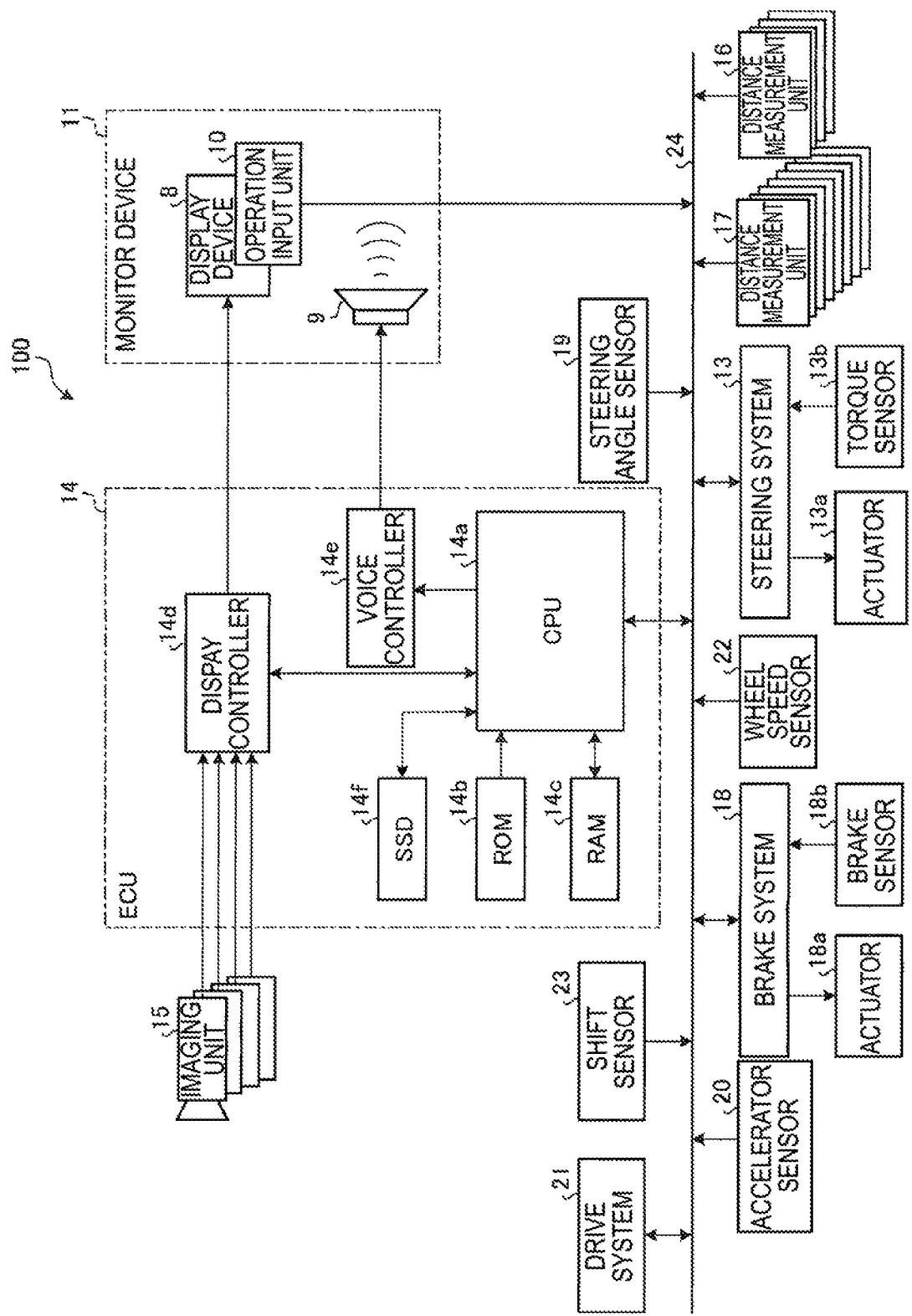
FIG. 2 is an exemplary and schematic block diagram illustrating a functional configuration of the vehicle including the periphery display control device according to the embodiment.

Further, as illustrated in FIG. 2, a display device 8 as a display output unit and a voice output device 9 as a voice output unit are provided in the vehicle room 2a. The display device 8 is, for example, a liquid crystal display (LCD) or an organic electroluminescence display (OELD). The voice output device 9 is, for example, a speaker. Further, the display device 8 is covered with, for example, a transparent operation input unit 10 such as a touch panel and the like. The occupant may recognize by eyes an image displayed on the display screen of the display device 8 via the operation input unit 10. The occupant may execute an operation input by operating the operation input unit 10 via touching, pushing, or moving with a finger or the like at a position corresponding to the image displayed on the display screen of the display device 8. The display device 8, the voice output device 9, the operation input unit 10, and the like are provided, for example, in a monitor device 11 which is positioned on the central portion in the vehicle width direction, i.e., in the transverse direction of the dashboard. The monitor device 11 may include an operation input unit (not illustrated) such as a switch, a dial, a joystick, or a push button. Further, a voice output device (not illustrated) may be provided at another position in the vehicle room 2a different from the monitor device 11, and voice may be output from the voice output device 9 of the monitor device 11 and the other voice output device. In addition, the monitor device 11 may also be used as, for example, a navigation system or an audio system.

Further, as illustrated in FIG. 1, the vehicle 1 is, for example, a four-wheel vehicle and includes two left and right front wheels 3F and two left and right rear wheels 3R. All of the four wheels 3 may be configured to be steerable. As illustrated in FIG. 2, the vehicle 1 includes a steering system 13 which steers at least two wheels 3. The steering system 13 includes an actuator 13a and a torque sensor 13b. The steering system 13 is electrically controlled by an electronic control unit (ECU) 14 and the like and operates the actuator 13a. The steering system 13 is, for example, an electric power steering system or a steer-by-wire (SBW) system. The steering system 13 applies a torque, i.e., an assistance torque to the steering unit by the actuator 13a to supplement a steering force, or steers the wheels 3 by the actuator 13a. In this case, the actuator 13a may steer one wheel 3, or may steer multiple wheels 3. Further, the torque sensor 13b detects, for example, the torque which is applied by the driver to the steering unit.

Further, as illustrated in FIG. 1, the vehicle body 2 is provided with multiple imaging units 15, e.g., four imaging units 15a to 15d. The imaging unit 15 is, for example, a digital camera in which an imaging element such as a charge coupled device (CCD) or a CMOS image sensor (CIS) is mounted. The imaging unit 15 may output video image data at a predetermined frame rate. Each imaging unit 15 includes a wide-angle lens or a fish-eye lens, and is capable of capturing an image of, for example, a range from 140° to 220° in the horizontal direction. Further, the optical axis of the imaging unit 15 is set obliquely downward. Thus, the imaging unit 15 sequentially captures an image of the external environment around the vehicle body 2 including the road surface on which the vehicle 1 is movable or an area in which the vehicle 1 may be parked, and outputs captured image data.

The imaging unit 15a is located, for example, at an end 2e on the rear side of the vehicle body 2 and is provided on a wall portion under a rear trunk. The imaging unit 15b is located, for example, at an end 2f on the right side of the vehicle body 2 and is provided on a door mirror 2g on the right side. The imaging unit 15c is located, for example, at an end 2c on the front side of the vehicle body 2, i.e., on the front side in the vehicle longitudinal direction and is provided on a front bumper and the like. The imaging unit 15d is located, for example, at an end 2d on the left side of the vehicle body 2, i.e., on the left side in the vehicle width direction and is provided on the door mirror 2g as a protrusion on the left side. The ECU 14 may perform an arithmetic processing or an image processing based on the captured image data obtained by the multiple imaging units 15 to generate an image with a wider viewing angle or to generate a virtual bird's eye view image of the vehicle 1 as viewed from above.

Further, the ECU 14 may identify a marking line and the like indicated on the road surface around the vehicle 1 from the image of the imaging unit 15 and may detect a parking section indicated by the marking line and the like.

Further, as illustrated in FIG. 1, the vehicle body 2 is provided with, for example, four distance measurement units 16a to 16d and eight distance measurement units 17a to 17h as multiple distance measurement units 16 and 17. The distance measurement units 16 and 17 may be, for example, a sonar (sonar sensor or ultrasonic detector) that emits ultrasonic waves and recognizes reflected waves. The ECU 14 may measure the presence or absence of an object such as an obstacle located around the vehicle 1 and the distance to the object based on the detection results of the distance measurement units 16 and 17. In addition, the distance measurement units 17 may be used, for example, to detect an object at a relatively short distance, and the distance measurement units 16 may be used, for example, to detect an object at a relatively long distance farther than the distance measurement units 17. Further, for example, the distance measurement units 17 may be used to detect an object in front of and behind the vehicle 1, and the distance measurement units 16 may be used to detect an object on the lateral side of the vehicle 1.

Further, as illustrated in FIG. 2, in a vehicle control system 100 including the periphery display control device, in addition to the ECU 14, the monitor device 11, the steering system 13, and the distance measurement units 16 and 17, and the like, a brake system 18, a steering angle sensor 19, an accelerator sensor 20, a drive system 21, a wheel speed sensor 22, a shift sensor 23, and the like are electrically connected via an in-vehicle network 24 as an electric communication line. The in-vehicle network 24 is configured as, for example, a controller area network (CAN). The ECU 14 may control the steering system 13, the brake system 18, the drive system 21, and the like by sending control signals via the in-vehicle network 24. Further, the ECU 14 may receive the detection results of the torque sensor 13b, a brake sensor 18b, the steering angle sensor 19, the distance measurement units 16 and 17, the accelerator sensor 20, the shift sensor 23, the wheel speed sensor 22, and the like, or an operational signal of the operation input unit 10 and the like via the in-vehicle network 24.

The ECU 14 includes, for example, a central processing unit (CPU) 14a, a read only memory (ROM) 14b, a random access memory (RAM) 14c, a display controller 14d, a voice controller 14e, a solid state drive (SSD) (flash memory) 14f, and the like. The CPU 14a may execute, for example, various arithmetic processings and controls such as an image processing related to the image displayed on the display device 8, determination of a parking target position of the vehicle 1 when executing parking assistance, an arithmetic operation (calculation) of a movement distance, an arithmetic operation (calculation) of a movement target position or a target vehicle speed for each time, determination of the presence or absence of interference with an object, and switching of the control of the vehicle 1 (switching between automatic control and cancellation of automatic control).

The CPU 14a may read out a program installed and stored in a non-volatile storage device such as the ROM 14b and may execute an arithmetic processing according to the program. The RAM 14c temporarily stores various data used in the arithmetic processing in the CPU 14a. Further, the display controller 14d mainly executes an image processing using image data obtained by the imaging units 15, combination of image data displayed on the display device 8 among the arithmetic processing in the ECU 14, or the like. Further, the voice controller 14e mainly executes a processing of voice data output from the voice output device 9 among the arithmetic processing in the ECU 14. Further, the SSD 14f is a rewritable non-volatile storage unit, and may store data even when the ECU 14 is powered off. In addition, the CPU 14a, the ROM 14b, the RAM 14c, and the like may be integrated in the same package. Further, the ECU 14 may have a configuration in which another logical arithmetic processor such as a digital signal processor (DSP) or a logic circuit is used instead of the CPU 14a. Further, a hard disk drive (HDD) may be provided instead of the SSD 14f, and the SSD 14f or the HDD may be provided separately from the ECU 14.

The brake system 18 is, for example, an anti-lock brake system (ABS) that prevents the lock of a brake, an electronic stability control (ESC) that prevents side slipping of the vehicle 1 at the time of cornering, an electric brake system that enhances a brake force (executes brake assistance), a brake-by-wire (BBW), or the like. The brake system 18 applies a braking force to the wheel 3 and thus to the vehicle 1 via an actuator 18a. Further, the brake system 18 may execute various controls by detecting the lock of the brake, idle rotation of the wheels 3, signs of the side slipping, and the like from the difference in rotation between the left and right wheels 3, and the like. The brake sensor 18b is, for example, a sensor that detects the position of a movable element of the braking operation unit. The brake sensor 18b may detect the position of the brake pedal as the movable element. The brake sensor 18b includes a displacement sensor.

The steering angle sensor 19 is, for example, a sensor that detects the amount of steering of the steering unit such as the steering wheel. For example, the steering angle sensor 19 is configured using a Hall element and the like. The ECU 14 executes various controls by acquiring the amount of steering of the steering unit by the driver or the amount of steering of each wheel 3 at the time of automatic steering from the steering angle sensor 19. In addition, the steering angle sensor 19 detects the rotation angle of a rotational element included in the steering unit. The steering angle sensor 19 is an example of an angle sensor.

The accelerator sensor 20 is, for example, a sensor that detects the position of a movable element of the acceleration operation unit. The accelerator sensor 20 may detect the position of the accelerator pedal as the movable element. The accelerator sensor 20 includes a displacement sensor.

The drive system 21 is an internal combustion engine (engine) system or a motor system as a drive source. The drive system 21 controls the fuel injection amount or the intake air amount of an engine and the output value of a motor according to the requested operation amount (e.g., the depression amount of the accelerator pedal) of the driver (user) detected by the accelerator sensor 20. Further, the output value of the engine or the motor may be controlled in cooperation with the control of the steering system 13 or the brake system 18 according to the traveling state of the vehicle 1 regardless of an operation of the user.

The wheel speed sensor 22 is a sensor that is provided on each wheel 3 and detects the amount of rotation of each wheel 3 or the number of revolutions per unit time. The wheel speed sensor 22 outputs, as a detected value, the number of wheel speed pulses indicating the detected number of revolutions. The wheel speed sensor 22 may be configured using a Hall element and the like. The CPU 14a calculates the vehicle speed or the amount of movement of the vehicle 1 based on the detected value acquired from the wheel speed sensor 22 and executes various controls. When calculating the vehicle speed of the vehicle 1 based on the detected value of the wheel speed sensor 22 of each wheel 3, the CPU 14a determines the vehicle speed of the vehicle 1 based on the speed of the wheel 3 having the smallest detected value among the four wheels and executes various controls. Further, when there is the wheel 3 having a detected value greater than that of the other wheels 3 among the four wheels, for example, when there is the wheel 3 having the number of revolutions per a unit period (unit time or unit distance) greater than that of the other wheels 3 by a predetermined number or more, the CPU 14a considers the wheel 3 to be in a slip state (idling state) and executes various controls. The wheel speed sensor 22 may also be provided in the brake system 18. In that case, the CPU 14a acquires the detection result of the wheel speed sensor 22 via the brake system 18.

The shift sensor 23 is, for example, a sensor that detects the position of a movable element of the speed-change operation unit. The shift sensor 23 may detect the position of a lever, an arm, a button, or the like as the movable element. The shift sensor 23 may include a displacement sensor, or may be configured as a switch.

In addition, the configuration, arrangement, and electrical connection form of the various sensors and actuators described above are given by way of example, and may be set (changed) in various ways.

In the present embodiment, the ECU 14 is in charge of an image generation processing of the image displayed on the display device 8 by cooperation of hardware and software (control program). The ECU 14 overlaps at least one of an own vehicle image indicating the position of the vehicle 1 (own vehicle) and the direction or posture of the vehicle 1 when the vehicle 1 is viewed from a virtual viewpoint and a target position to which the vehicle 1 (own vehicle image) moves on a vehicle surrounding image generated by performing an image processing, for example, a viewpoint conversion processing on the captured image data (captured images) imaged by the imaging units 15 to display the images on the display device 8. In that case, when the vehicle 1 moves to the target position, the ECU 14 generates, based on a relative angle of the target position with respect to the moving direction of the vehicle 1, a virtual viewpoint image while moving at least one of a virtual viewpoint and a gazing point when facing the area including at least one of the vehicle 1 or the target position from the virtual viewpoint. In addition, the virtual viewpoint is set to a position that faces the target position across the vehicle 1. Further, the virtual viewpoint image is generated in a state where the distance between the virtual viewpoint and the gazing point is maintained and the heights of the virtual viewpoint and the gazing point are maintained.

Figure 3:
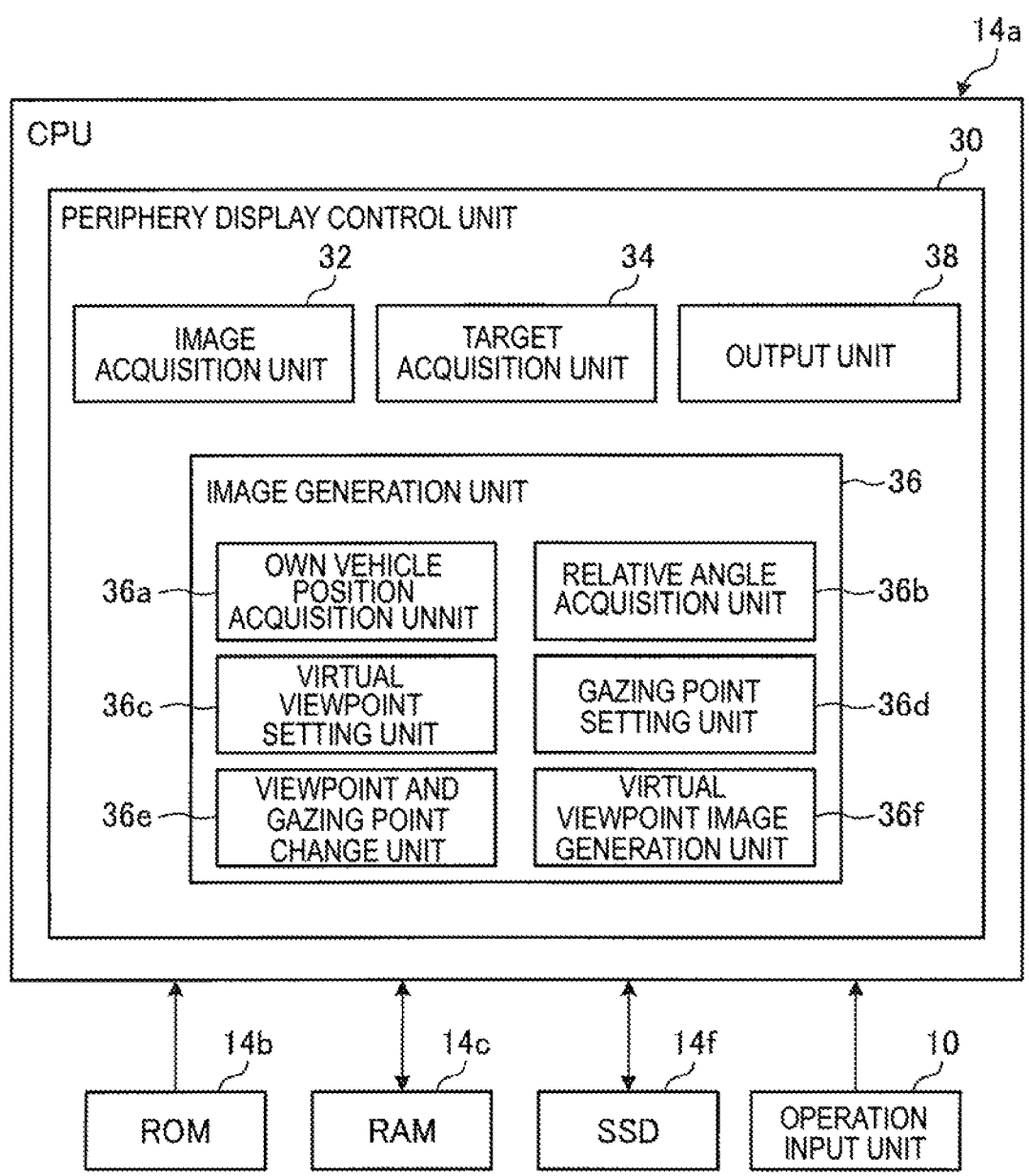
FIG. 3 is a block diagram exemplarily and schematically illustrating a configuration in a case where the periphery display control device according to the embodiment is realized by a CPU.

FIG. 3 is a block diagram exemplarily and schematically illustrating a configuration in a case where the periphery display control device is realized by the CPU 14a. The CPU 14a realizes a periphery display control unit 30 by executing a periphery display control program read from the ROM 14b. The periphery display control unit 30 (periphery display control device) includes various modules for realizing a function thereof. The periphery display control unit 30 includes, for example, an image acquisition unit 32, a target acquisition unit 34, an image generation unit 36, an output unit 38, and the like. Further, the image generation unit 36 includes detailed modules such as an own vehicle position acquisition unit 36a, a relative angle acquisition unit 36b, a virtual viewpoint setting unit 36c, a gazing point setting unit 36d, a viewpoint and gazing point change unit 36e, and a virtual viewpoint image generation unit 36f.

Figure 4:
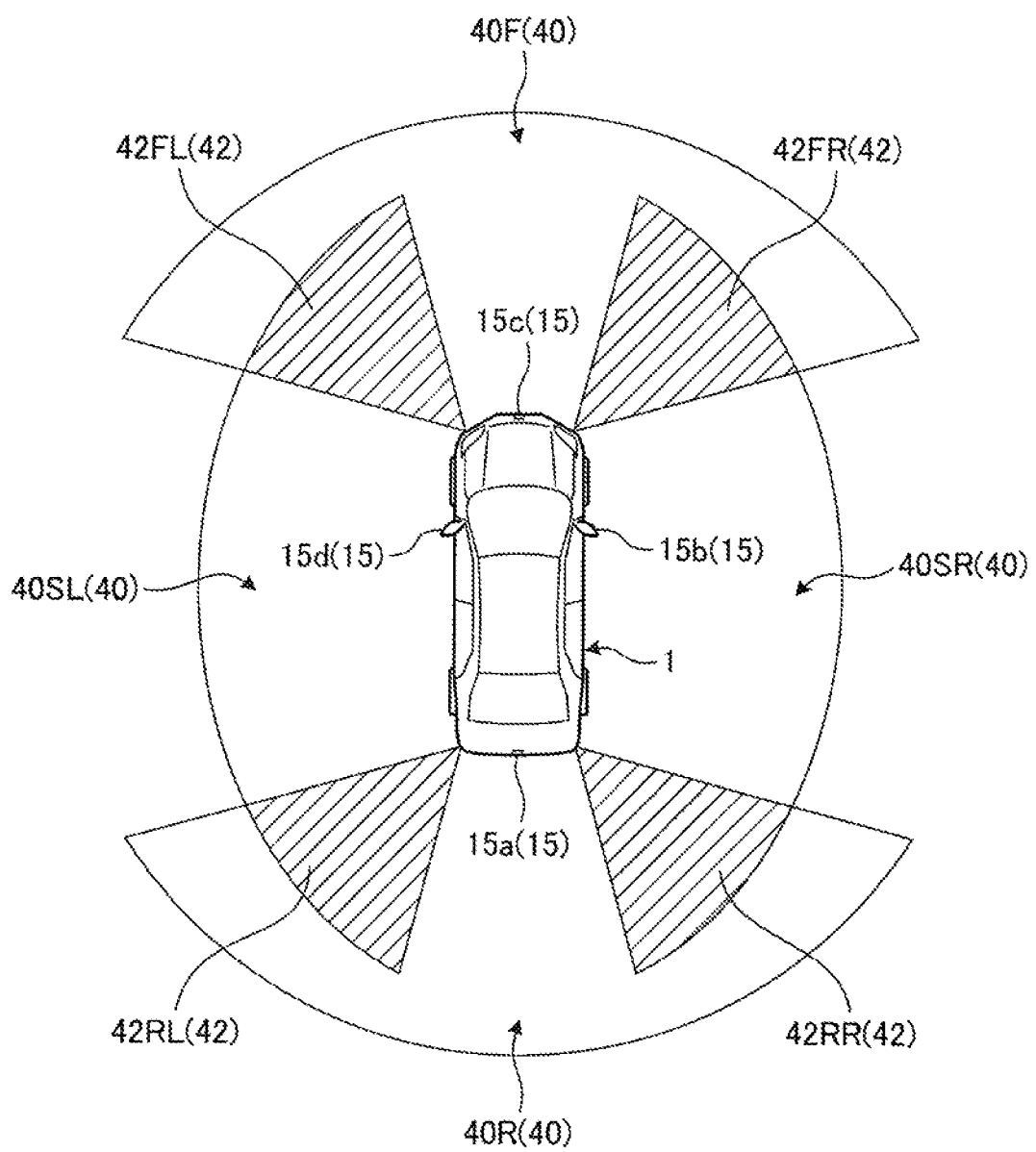
FIG. 4 is an exemplary and schematic bird's-eye view for explaining imaging target areas imaged by respective imaging units and overlapping areas thereof in the periphery display control device according to the embodiment.

The image acquisition unit 32 acquires the captured image data (captured images) imaged by the respective imaging units 15 via the display controller 14d. Each of the imaging units 15 (15a to 15d) is capable of imaging an imaging target area 40 as illustrated in FIG. 4. Each imaging target area 40 includes overlapping areas 42 in which portions of adjacent imaging target areas 40 overlap each other. By forming the overlapping areas 42, no missing area is generated when the imaging target areas 40 are connected to each other. For example, in the imaging target areas 40, the left side in the vehicle width direction of an imaging target area 40F in front of the vehicle 1 imaged by the imaging unit 15c and the vehicle front side of an imaging target area 40SL on the left side of the vehicle 1 imaged by the imaging unit 15d form an overlapping area 42FL. In the imaging target areas 40, the vehicle rear side of the imaging target area 40SL and the left side in the vehicle width direction of an imaging target area 40R behind the vehicle 1 imaged by the imaging unit 15a form an overlapping area 42RL. In the imaging target areas 40, the right side in the vehicle width direction of the imaging target area 40R and the vehicle rear side of an imaging target area 40SR on the right side of the vehicle 1 imaged by the imaging unit 15b form an overlapping area 42RR. Then, in the imaging target areas 40, the vehicle front side of the imaging target area 40SR and the right side in the vehicle width direction of the imaging target area 40F form an overlapping area 42FR. Each imaging unit 15 may attach an identification code for each imaging unit 15 to the captured image data to output the captured image data to the image acquisition unit 32, or may attach an identification code that identifies an output source for each captured image data acquired by the image acquisition unit 32 side.

The target acquisition unit 34 acquires a target position to which the vehicle 1 moves. The target position may be acquired, for example, by being manually designated by the user, or may be automatically acquired in the process in which the CPU 14a (ECU 14) performs traveling assistance such as parking assistance for the vehicle 1. As the target position, for example, the user may designate an arbitrary position on the captured image that is imaged by the imaging unit 15 and is displayed on the display device 8 using the operation input unit 10 and the like. Further, when the CPU 14a (ECU 14) may identify a marking line indicated on the road surface around the vehicle 1 from the captured image of the imaging unit 15 and detect a parking section indicated by the marking line, it may make it possible for the CPU 14a to designate the target position from the detected parking section. Further, in known parking assistance or traveling assistance, the target position may be a position at which the vehicle performs a quick turn in the process of moving to the target position or a position at which the vehicle temporarily stops. The acquisition of the target position is not limited to these examples, and may be acquired by other methods as long as the position to which the vehicle 1 needs to move may be acquired.

The image generation unit 36 generates a virtual viewpoint image that indicates the situation around the vehicle 1 in a virtual space based on the captured image data (captured images) acquired by the image acquisition unit 32 and indicates the process in which the vehicle 1 moves from a current position to the target position. Specifically, as described in FIG. 4, two-dimensional composite image data indicating the periphery (e.g., 360°) of the vehicle 1 is created by connecting the respective imaging target areas 40 such that the overlapping areas 42 are formed. In addition, in the overlapping areas 42, a blending processing of overlapping captured image data may be executed. For example, in the overlapping area 42FL, a blend processing is executed to blend images using a % of each of the captured image data of the front imaging target area 40F and the captured image data of the left imaging target area 40SL. By executing the blend processing, the front imaging target area 40F and the left imaging target area 40SL are synthesized so as to change gradually, which may make a boundary line caused by the difference in brightness or hue be inconspicuous. Similarly, by executing the blend processing in the other overlapping areas 42, the boundary line may be made inconspicuous in the entire synthesized two-dimensional composite image data.

Figure 5:
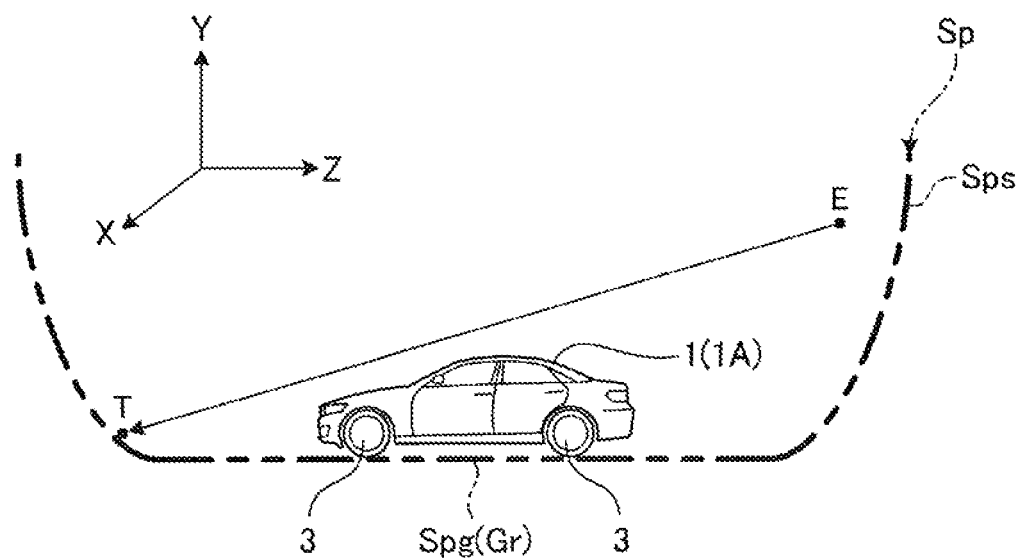
FIG. 5 is a schematic and exemplary explanatory view illustrating a vehicle and a virtual projection plane in the periphery display control device according to the embodiment.

Subsequently, the image generation unit 36 reads out a virtual projection plane Sp that is a three-dimensional shape model as illustrated in FIG. 5 and is stored in advance in the ROM 14b or the like. The virtual projection plane Sp is data of a mesh structure in which coordinates X, Y, and Z are defined, and data of each pixel of the synthesized two-dimensional composite image data is projected at the intersection of a mesh (intersection defined by the coordinates X, Y, and Z).

The virtual projection plane Sp has, for example, a bottom surface Spg along the ground Gr and a side surface Sps rising from the bottom surface Spg, i.e., the ground Gr as illustrated in FIG. 5. The ground Gr is a horizontal plane (X-Z plane) orthogonal to the height direction (vertical direction: Y) of the vehicle 1 and is also a ground contact surface of the wheel 3. The bottom surface Spg is, for example, a substantially circular flat surface, and is a horizontal surface on the basis of the vehicle 1. The side surface Sps is, for example, a curved surface that is in contact with the bottom surface Spg and rises in the height direction from a portion of the bottom surface Spg to surround a portion of the bottom surface Spg. As illustrated in FIG. 5, with respect to the side surface Sps, the shape of a virtual cross section when the cross section is taken in the vertical direction (vertical direction of the vehicle 1: Y) is, for example, a part of an elliptical shape or a parabolic shape. The side surface Sps is configured as, for example, a rotating surface around the center line along the height direction Y centered on the vehicle 1. That is, the side surface Sps surrounds the periphery of the vehicle 1. By projecting the two-dimensional composite image data onto the virtual projection plane Sp, it is possible to generate a three-dimensional vehicle surrounding image (data) indicating the surrounding situation with the vehicle 1 as the center. In addition, in another example, the captured image data imaged by the imaging units 15 may be projected onto the virtual projection plane Sp without generation of the two-dimensional composite image data. The method of generating the vehicle surrounding image is an example, and a known peripheral image generation technology may be used.

The three-dimensional vehicle surrounding image (data) generated in this way may be an image when the situation around the vehicle 1 is viewed from an arbitrary viewpoint by changing the position of the virtual viewpoint. For example, as illustrated in FIG. 5, a virtual viewpoint E is set to a position that faces (e.g., looks down at) a target position (e.g., position in front of the vehicle 1) across the vehicle 1 (own vehicle) from, for example, a position higher than the vehicle 1. Further, a gazing point T that is the direction of a viewpoint when facing the area including at least one of the vehicle 1 or the target position from the virtual viewpoint E is set. In this case, the three-dimensional vehicle surrounding image is a virtual viewpoint image that indicates an area in front of the vehicle 1 while looking down at the vehicle 1 from the sky behind the vehicle 1. Further, when the position of the virtual viewpoint E is set in the sky at the right side of the vehicle 1, a three-dimensional vehicle surrounding image (virtual viewpoint image) that faces the left side of the vehicle 1 across the vehicle 1 is obtained. In addition, the image generation unit 36 of the present embodiment generates a virtual viewpoint image in a state where the distance between the virtual viewpoint E and the gazing point T is maintained and the heights of the virtual viewpoint E and the gazing point T are maintained. As a result, even when the vehicle 1 moves toward the target position P, the generated virtual viewpoint image moves parallel to the ground Gr and the angle at which the target position or a surrounding three-dimensional object is looked down from the virtual viewpoint E does not change. The effect based on the fact that the angle at which the target position or the surrounding three-dimensional object is looked down from the virtual viewpoint E will be described later with reference to the drawings.

In order to generate the virtual viewpoint image as described above, the image generation unit 36, as described above, includes detailed modules such as the own vehicle position acquisition unit 36a, the relative angle acquisition unit 36b, the virtual viewpoint setting unit 36c, the gazing point setting unit 36d, the viewpoint and gazing point change unit 36e, and the virtual viewpoint image generation unit 36f.

The own vehicle position acquisition unit 36a sets, for example, the center position of the vehicle 1 at the origin on the relative coordinate system when a periphery display request is made from the user via the operation input unit 10 and the like, and acquires the set center position as an own vehicle position. In addition, the center position of the vehicle 1 may be, for example, the intersection of a longitudinal direction line passing through the midpoint in the vehicle width direction of the vehicle 1 and a vehicle width direction line passing through the midpoint in the vehicle length direction, or a point at which a normal line from the intersection meets the ground Gr.

Figure 6:
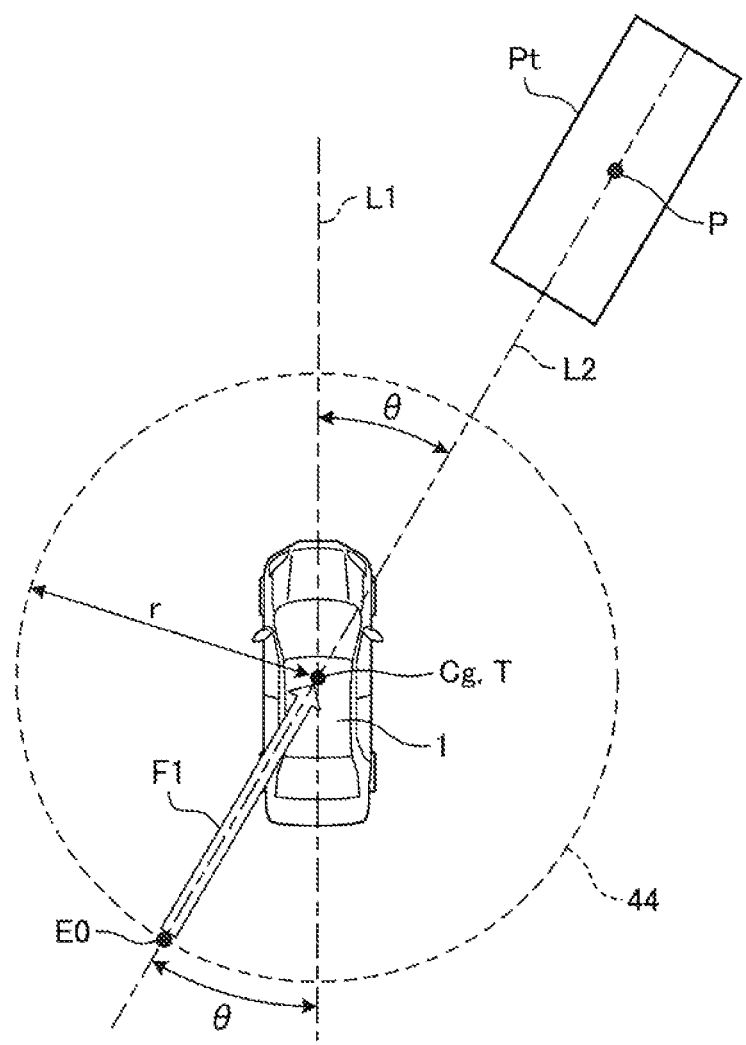
FIG. 6 is an exemplary and schematic bird's eye view for explaining a case where a virtual viewpoint is set on the outer peripheral surface of a virtual cylinder that is set around an own vehicle and a gazing point is set at a position corresponding to the vehicle center of the own vehicle in a periphery display control device according to a first embodiment.

The relative angle acquisition unit 36b acquires a relative angle defined by the direction in which the target position exists with respect to the movement direction of the vehicle 1. FIG. 6 illustrates the vehicle 1 and a target position P. In the case of FIG. 6, a target area Pt including the target position P is also illustrated. As described above, the target position P is a position acquired by the target acquisition unit 34 and is, for example, a position designated by the user using the operation input unit 10 and the like. The relative angle acquisition unit 36b acquires, as a relative angle θ, the angle formed by a first direction line L1 that passes through a center position Cg of the vehicle 1 and extends in the vehicle length direction (longitudinal direction) and a second direction line L2 that passes through the center position Cg and the target position P on the relative coordinate system.

The virtual viewpoint setting unit 36c sets the position of the virtual viewpoint E based on the relative angle θ acquired by the relative angle acquisition unit 36b. Since the virtual viewpoint image is an image that allows the user to recognize the surrounding situation related to the vehicle 1 in the process in which the vehicle 1 moves to the target position P, the virtual viewpoint image may include at least one of the vehicle 1 and the target position P. Therefore, the virtual viewpoint E may be set on the side opposite to the target position P across the vehicle 1. For example, as illustrated in FIG. 6, the virtual viewpoint setting unit 36c of the present embodiment sets, as a viewpoint direction reference point E0, the intersection of an extension line obtained by extending the second direction line L2 that interconnects the target position P and the center position Cg beyond the vehicle 1 and a virtual circle 44 having, for example, a radius r centered on the center position Cg which is set so as to surround the vehicle 1. Then, the virtual viewpoint setting unit 36c sets, to the virtual viewpoint E, the position to which the viewpoint direction reference point E0 is moved by a distance h in the height direction on the outer peripheral surface of a virtual cylinder 44A that rises perpendicularly to the ground Gr from the virtual circle 44 as the bottom surface.

The gazing point setting unit 36d sets the gazing point T so as to face the area including at least one of the vehicle 1 or the target position P. The gazing point T is set to a position that is mainly desired to be noticed when a virtual viewpoint image is displayed. For example, as illustrated in FIG. 6, the gazing point T may be set to the same position as the center position Cg of the vehicle 1, may be set to a position between the vehicle 1 and the target position P, or may be set to the same position as the target position P. The gazing point T may be set in advance as an initial setting position, or may be set manually by the user using the operation input unit 10 and the like whenever a virtual viewpoint image is displayed.

The viewpoint and gazing point change unit 36e changes the position of the virtual viewpoint E and the position of the gazing point T on the relative coordinate system so as to correspond to the behavior of the vehicle 1 when the vehicle 1 moves to the target position P. However, the viewpoint and gazing point change unit 36e changes the position of the virtual viewpoint E and the position of the gazing point T in a state where the distance from the virtual viewpoint E to the gazing point T is maintained and the heights of the virtual viewpoint E and the gazing point T are maintained. That is, the virtual viewpoint E and the gazing point T are moved parallel to the ground Gr in a state where a relative relationship therebetween is maintained. For example, when the vehicle 1 moves so as to approach the target position P, the virtual viewpoint E and the gazing point T may be changed in position so as to approach the target position P while maintaining a relative positional relationship therebetween. Further, when the vehicle 1 turns with respect to the target position P, the gazing point T may move while the virtual viewpoint E moves parallel to the ground Gr on the outer peripheral surface of the virtual cylinder 44A according to the turning angle of the vehicle 1 in a state where the relative positional relationship between the virtual viewpoint E and the gazing point T is maintained. In addition, the viewpoint and gazing point change unit 36e may change the height of the virtual viewpoint E when the vehicle 1 completes movement to the target position P. For example, the position of the virtual viewpoint E is slightly lowered. In this case, the appearance of the virtual viewpoint image may change, and a virtual viewpoint image that makes it easy for the user to understand that the vehicle 1 has reached the target position may be generated.

The virtual viewpoint image generation unit 36f projects the captured image data (captured images) acquired by the image acquisition unit 32 to the virtual projection plane Sp illustrated in FIG. 5 according to a change in the position of the virtual viewpoint E or the gazing point T by the viewpoint and gazing point change unit 36e, i.e., according to the movement (behavior) of the vehicle 1. As a result, it is possible to sequentially update the changing virtual viewpoint image so as to correspond to the movement (behavior) of the vehicle 1. The output unit 38 outputs and displays the virtual viewpoint image generated by the virtual viewpoint image generation unit 36f on the display device 8 via the display controller 14d.

Figure 15:
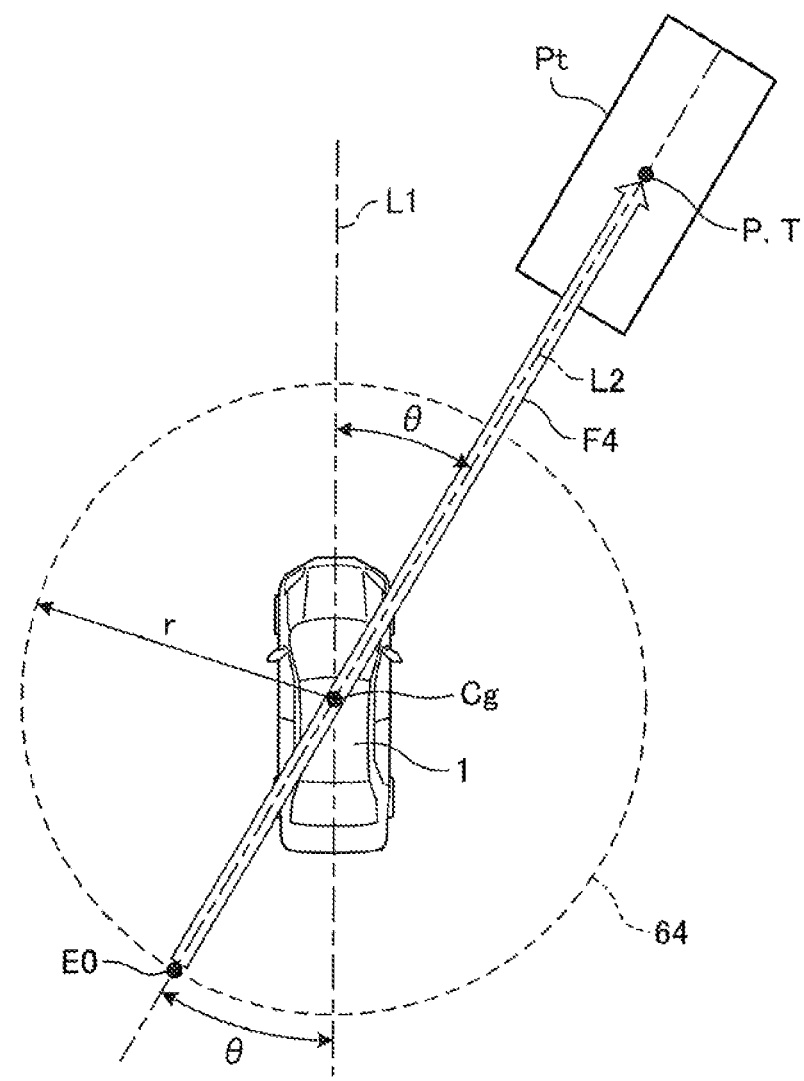
FIG. 15 is an exemplary and schematic bird's-eye view for explaining a case where a virtual viewpoint is set on the outer peripheral surface of a virtual cylinder that is set around an own vehicle and a gazing point is set at a target position as a comparative example.
Figure 16:
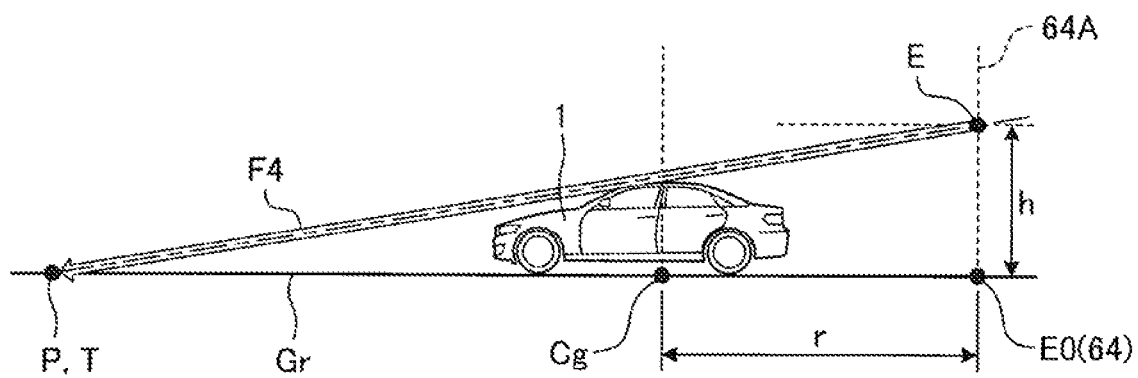
FIG. 16 is an exemplary and schematic side view for explaining the case where the virtual viewpoint is set on the outer peripheral surface of the virtual cylinder that is set around the own vehicle and the gazing point is set at the target position as the comparative example.
Figure 17:
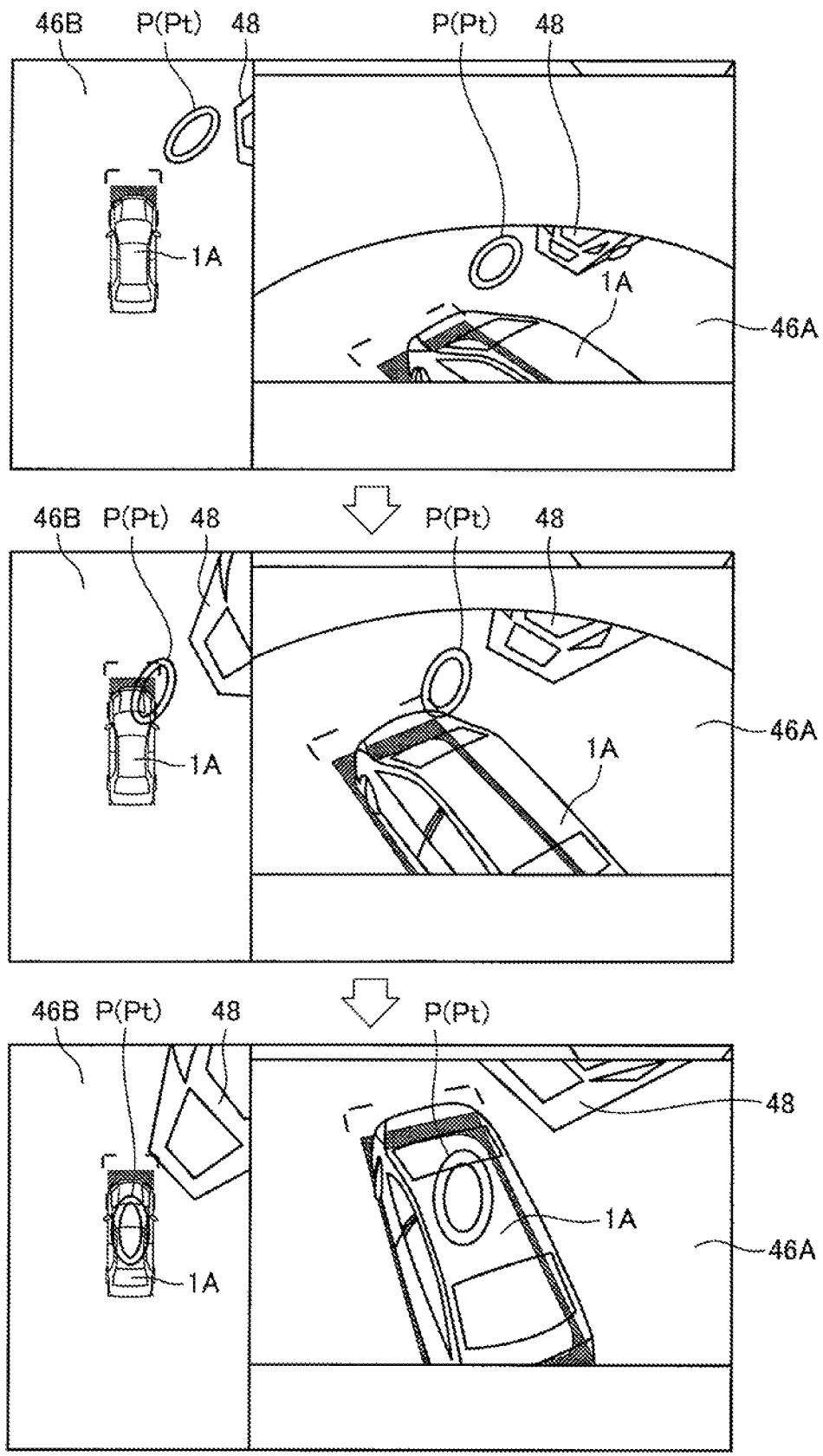
FIG. 17 is a view illustrating a schematic display image as a comparative example in which a virtual viewpoint image that undergoes transition with the movement of the own vehicle and a bird's-eye view image are displayed in two-screen display when the virtual viewpoint and the gazing point are set as illustrated in FIGS. 15 and 16.
Figure 18:
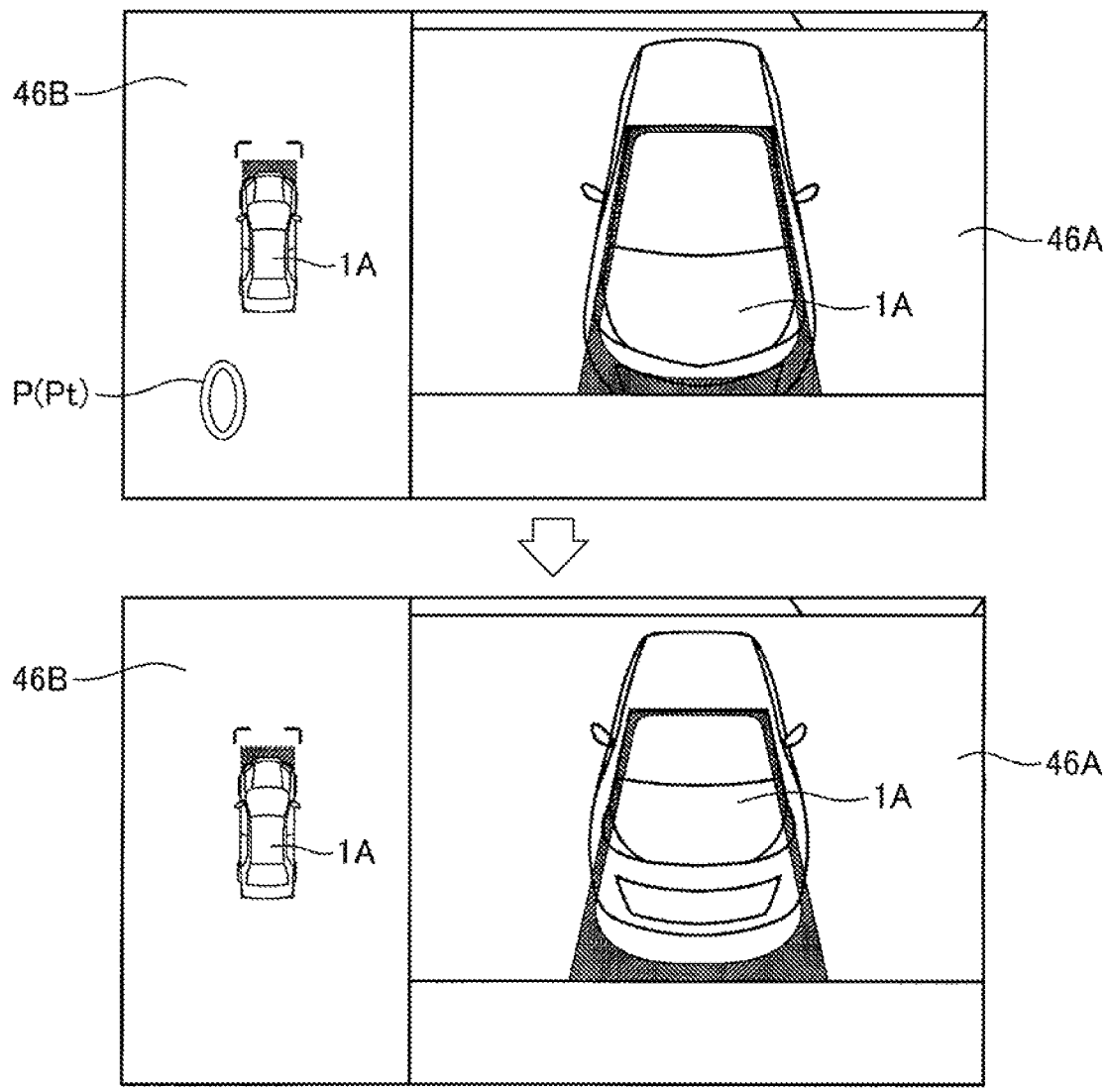
FIG. 18 is a view illustrating a schematic and exemplary display image for explaining a case where the height of a virtual viewpoint is changed (lowered) when an own vehicle completes movement to a target position in the periphery display control device according to the embodiment.

Display examples of the virtual viewpoint image generated using the periphery display control unit 30 configured as described above will be described with reference to FIGS. 6 to 14. In addition, as reference examples, display examples in which a three-dimensional object existing in the vicinity is easily deformed are illustrated in FIGS. 15 to 17. Further, FIG. 18 is a display example of a virtual viewpoint image when the viewpoint and gazing point change unit 36e changes the height of the virtual viewpoint E when the vehicle 1 completes movement to the target position P.

First Embodiment

Figure 7:
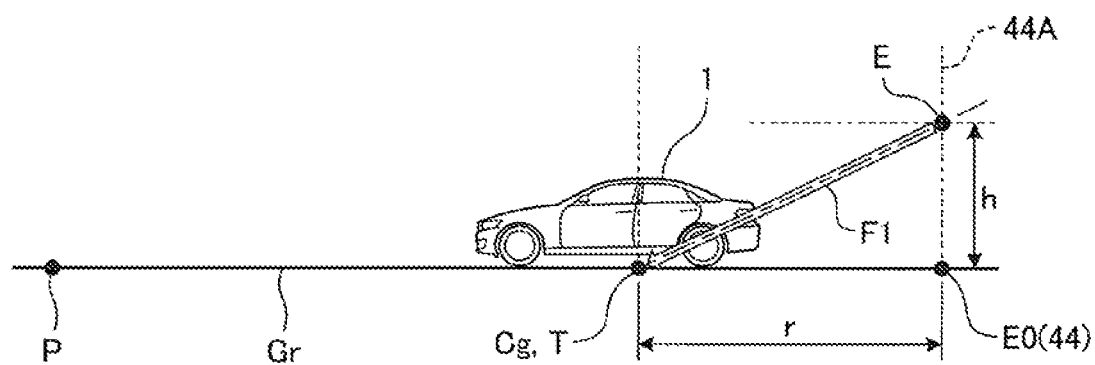
FIG. 7 is an exemplary and schematic side view for explaining the case where the virtual viewpoint is set on the outer peripheral surface of the virtual cylinder that is set around the own vehicle and the gazing point is set at the position corresponding to the vehicle center of the own vehicle in the periphery display control device according to a first embodiment.
Figure 8:
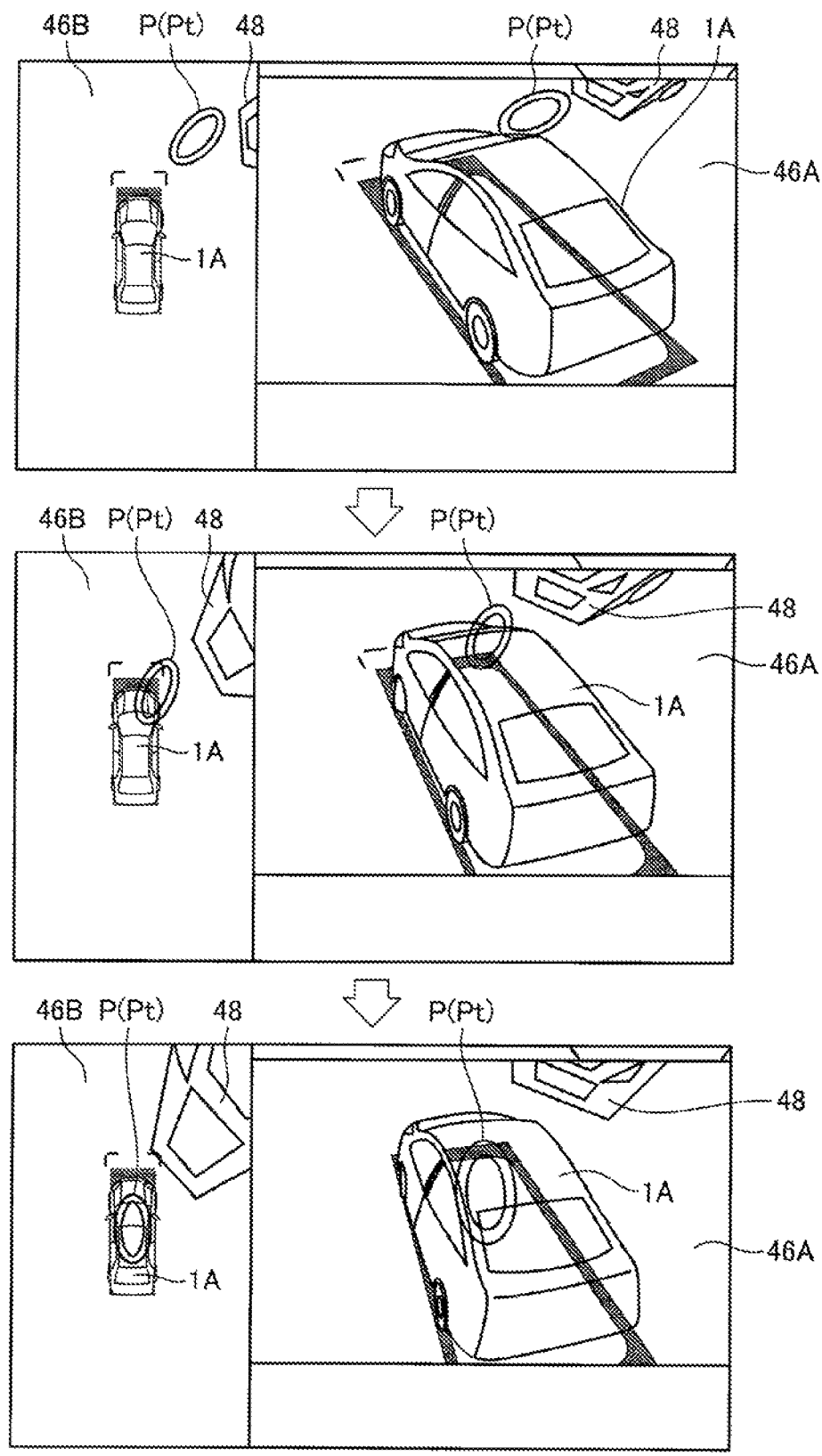
FIG. 8 is a view illustrating a schematic and exemplary display image in which a virtual viewpoint image that undergoes transition with the movement of the own vehicle and a bird's-eye view image are displayed in two-screen display when the virtual viewpoint and the gazing point are set as illustrated in FIGS. 6 and 7.

FIGS. 6 to 8 illustrate a case where the gazing point T is set to the center position Cg of the vehicle 1 by the gazing point setting unit 36d according to a first embodiment. In addition, in the first embodiment, the gazing point T is set, for example, to the same height as the ground Gr, but is not limited thereto. Further, in this example, it is assumed that, at a time point when a display request for a virtual viewpoint image is made, the image acquisition unit 32 acquires a captured image around the vehicle 1 and the target acquisition unit 34 acquires (designates), for example, a position obliquely forward of the right side of the vehicle 1 as the target position P (target area Pt).

As described above, when a display request for a virtual viewpoint image is made, the own vehicle position acquisition unit 36a sets the current position of the vehicle 1 (e.g., the center position Cg) at the origin position on the relative coordinate system, and acquires the set position as an own vehicle position. Subsequently, the relative angle acquisition unit 36b acquires, as the relative angle θ, the angle formed by the first direction line L1 that passes through the center position Cg of the vehicle 1 and extends in the vehicle length direction and the second direction line L2 that passes through the center position Cg and the target position P on the relative coordinate system. Then, the virtual viewpoint setting unit 36c sets the position of the virtual viewpoint E based on the relative angle θ acquired by the relative angle acquisition unit 36b. In the case of FIG. 6, as described above, the virtual viewpoint setting unit 36c sets, as the viewpoint direction reference point E0, the intersection position between the extension line of the second direction line L2 extending beyond the vehicle 1 and the virtual circle 44 having the radius r (e.g., r=4 m) centered on the center position Cg of the vehicle 1. Then, as illustrated in FIG. 7, the virtual viewpoint setting unit 36c moves the viewpoint direction reference point E0 on the outer peripheral surface of the virtual cylinder 44A in the height direction by the distance h (e.g., 2 m) to set the virtual viewpoint E at the moved position. In the first embodiment, as illustrated in FIGS. 6 and 7, the virtual viewpoint E is set in the sky obliquely rearward of the left side of the vehicle 1. The viewpoint and gazing point change unit 36e changes the positions of the virtual viewpoint E and the gazing point T according to a change in the relative position of the vehicle 1 and the target position P (target area Pt) (according to the movement state of the vehicle 1 with respect to the target position P). In this case, the virtual viewpoint E and the gazing point T move according to the behavior of the vehicle 1 in a state where a certain relationship therebetween is maintained. That is, as indicated by an arrow F1 in FIGS. 6 and 7, the positions of the virtual viewpoint E and the gazing point T change according to the behavior of the vehicle 1 in a state where the distance between the virtual viewpoint E and the gazing point T is maintained and in a state where the heights of the virtual viewpoint E and the gazing point T are maintained. Then, as described with reference to FIG. 5, the virtual viewpoint image generation unit 36f sequentially generates virtual viewpoint images by projecting a captured image when the gazing point T is viewed from the virtual viewpoint E onto the virtual projection plane Sp.

FIG. 8 is a view illustrating the transition of a virtual viewpoint image 46A in a case where an own vehicle image 1A corresponding to the vehicle 1 moves toward the target position P (target area Pt) in a state where the distance between the virtual viewpoint E and the gazing point T is maintained and in a state where the heights of the virtual viewpoint E and the gazing point T are maintained. FIG. 8 is an example in which the virtual viewpoint image 46A and a bird's eye view image 46B when the vehicle 1 is looked down from directly above are displayed side by side on the display device 8. In addition, the own vehicle image 1A displayed on the virtual viewpoint image 46A is image data that is stored in advance in the ROM 14b or the like. The own vehicle image 1A may be an image indicating the shape of the vehicle 1, and a constituent plane (surface) of the vehicle 1 may be composed of, for example, multiple polygons. That is, the own vehicle image 1A has a stereoscopic shape (three-dimensional shape) indicated by multiple polygons (mainly triangular polygons). Thus, the own vehicle image 1A with further reality may be displayed. Further, the own vehicle image 1A composed of multiple polygons may be rotated with respect to each of the X-axis, the Y-axis, and the Z-axis, so that the own vehicle image 1A may be directed in a desired direction according to the position of the virtual viewpoint E. Meanwhile, the own vehicle image 1A displayed on the bird's eye view image 46B may use an image stored in the ROM 14b or the like as a fixed bird's eye view image when the vehicle 1 is viewed from directly above. This is equally applied to the own vehicle image 1A illustrated in other embodiments.

In addition, as illustrated in FIG. 8, in a case of the bird's eye view image 46B, the shape of a three-dimensional object (e.g., another vehicle 48) existing around the vehicle 1 (own vehicle image 1A), i.e., the appearance (e.g., distortion or extension) of the other vehicle 48 differs depending on a relative positional relationship between the vehicle 1 and the other vehicle 48 since the virtual viewpoint E is set to the position directly above the vehicle 1 (own vehicle image 1A: gazing point T). Meanwhile, with such a bird's eye view image, it is easier to grasp the distance from the vehicle 1 (own vehicle image 1A) to the surrounding three-dimensional object (e.g., the other vehicle 48) or the shape of the surrounding three-dimensional object than in the virtual viewpoint image 46A in which the virtual viewpoint E does not exist directly above the gazing point T. Accordingly, as illustrated in FIG. 8, by displaying the virtual viewpoint image 46A and the bird's eye view image 46B side by side, display may be made to make it easy for the user to recognize the situation around the vehicle 1.

As illustrated in FIGS. 6 and 7, in the first embodiment, the virtual viewpoint E is set on the virtual cylinder 44A (virtual circle 44) centered on the center position Cg of the vehicle 1. Then, the virtual viewpoint E moves parallel to the ground Gr according to the relative angle θ acquired by the relative angle acquisition unit 36b while looking down at the gazing point T which is set at the center position Cg of the vehicle 1 at the same height (e.g., h=2 m) of the virtual cylinder 44A. That is, the angle at which the vehicle 1 is looked down from the virtual viewpoint E and the angle at which the three-dimensional object existing around the vehicle 1 (e.g., the other vehicle 48 or the like) is looked down from the virtual viewpoint E do not substantially change. As a result, even when the virtual viewpoint E moves in the circumferential direction on the virtual cylinder 44A as the vehicle 1 moves toward the target position P (target area Pt), as illustrated in FIG. 8, the vehicle 1 and the other vehicle 48 existing around the vehicle appear to rotate on the ground Gr according to the position of the virtual viewpoint E. In this case, the size of the outer shape of the own vehicle image 1A does not substantially change. Further, as illustrated in FIG. 8, when the vehicle 1 (own vehicle image 1A) gradually approaches the target position P (target area Pt), the other vehicle 48 existing in the vicinity enlarges and approaches according to the distance from the virtual viewpoint E, so that the shape thereof is prevented from unnaturally expanding or contracting or being distorted in the process of movement of the vehicle 1.

As described above, according to the periphery display control unit 30 (periphery display control device) of the present embodiment, when the virtual viewpoint image 46A is displayed, a change in the appearance (e.g., distortion or extension) of the three-dimensional object existing around the vehicle 1 (own vehicle image 1A) may be prevented. As a result, display may be made to make it easy to grasp the behavior of the vehicle 1 (own vehicle image 1A) approaching the target position P (target area Pt) while avoiding deterioration in the reality of the virtual viewpoint image 46A.

Second Embodiment

Figure 9:
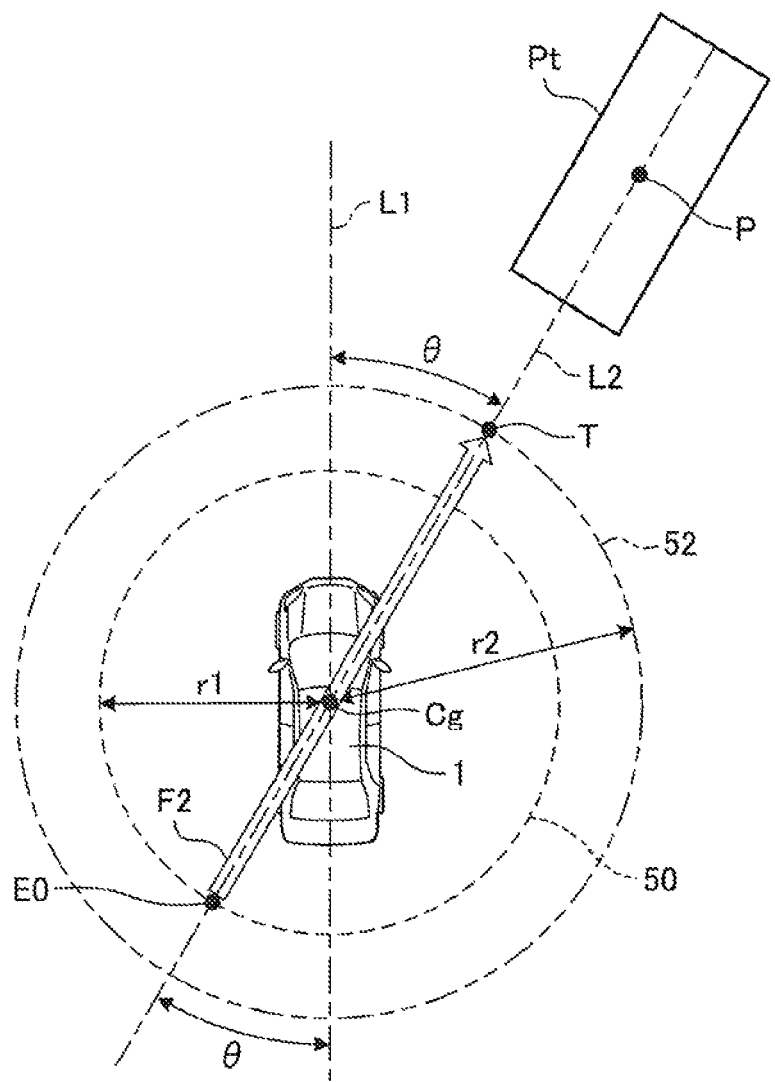
FIG. 9 is an exemplary and schematic bird's eye view for explaining a case where a virtual viewpoint and a gazing point are set on the outer peripheral surfaces of different virtual cylinders that are set around an own vehicle in a periphery display control device according to a second embodiment.
Figure 10:
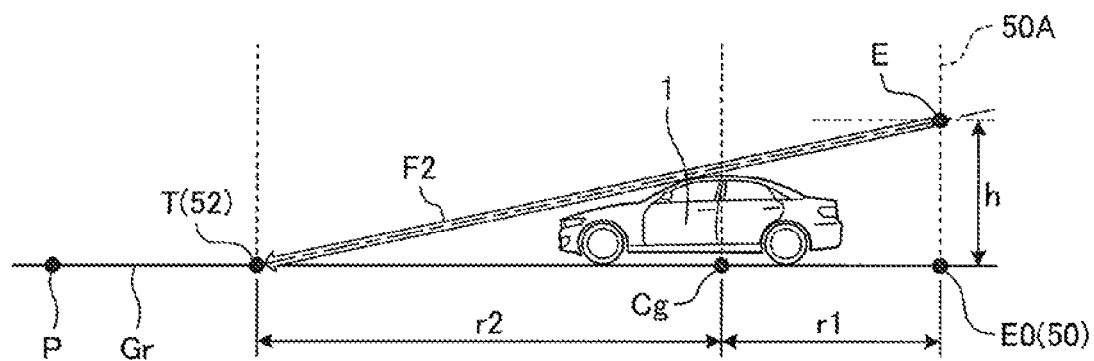
FIG. 10 is an exemplary and schematic side view for explaining the case where the virtual viewpoint and the gazing point are set on the outer peripheral surfaces of different virtual cylinders that are set around the own vehicle in the periphery display control device according to the second embodiment.
Figure 11:
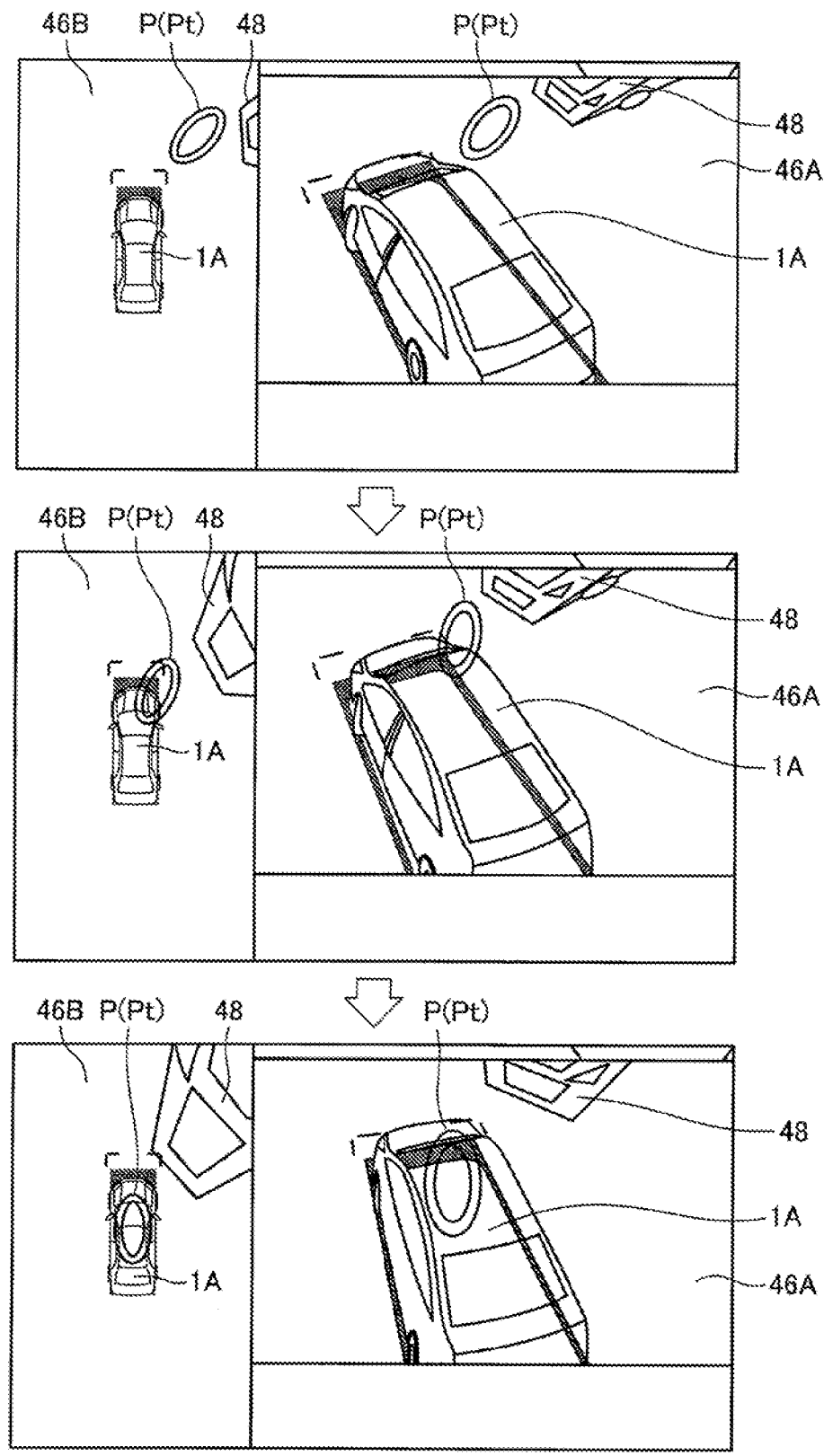
FIG. 11 is a view illustrating a schematic and exemplary display image in which a virtual viewpoint image that undergoes transition with the movement of the own vehicle and a bird's-eye view image are displayed in two-screen display when the virtual viewpoint and the gazing point are set as illustrated in FIGS. 9 and 10.

FIGS. 9 to 11 illustrate a case where the gazing point T is set on a virtual circle centered on the center position Cg of the vehicle 1 by the gazing point setting unit 36d according to a second embodiment. In addition, in the second embodiment, the gazing point T is set, for example, to the same height as the ground Gr, but is not limited thereto. The second embodiment illustrates an example in which the gazing point T is set on a second virtual circle 52. The second virtual circle 52 is different from a first virtual circle 50 used to set the viewpoint direction reference point E0 and having a radius r1 and has a radius r2 greater than the radius r1 of the first virtual circle 50. In addition, in another embodiment, the viewpoint direction reference point E0 and the gazing point T may be set on virtual circles having the same radius. Further, in the second embodiment as well, similarly to the first embodiment, it is assumed that, at a time point when a display request for a virtual viewpoint image is made, the image acquisition unit 32 acquires a captured image around the vehicle 1 and the target acquisition unit 34 acquires (designates), for example, a position obliquely forward of the right side of the vehicle 1 as the target position P (target area Pt).

As in the first embodiment, when a display request for a virtual viewpoint image is made, the own vehicle position acquisition unit 36a sets the current position of the vehicle 1 (e.g., center position Cg) at the origin position on the relative coordinate system, and acquires the set position as an own vehicle position. Subsequently, the relative angle acquisition unit 36b acquires, as the relative angle θ, the angle formed by the first direction line L1 that passes through the center position Cg of the vehicle 1 and extends in the vehicle length direction and the second direction line L2 that passes through the center position Cg and the target position P on the relative coordinate system. Then, the virtual viewpoint setting unit 36c sets the position of the virtual viewpoint E based on the relative angle θ acquired by the relative angle acquisition unit 36b. In the case of FIG. 9, the virtual viewpoint setting unit 36c sets, to the viewpoint direction reference point E0, the intersection position between the extension line of the second direction line L2 extending beyond the vehicle 1 and the first virtual circle 50 having the radius r1 (e.g., r=4 m) centered on the center position Cg of the vehicle 1. Then, as illustrated in FIG. 10, the virtual viewpoint setting unit 36c moves the viewpoint direction reference point E0 on the outer peripheral surface of a virtual cylinder 50A in the height direction by the distance h (e.g., 2 m) and sets the virtual viewpoint E at the moved position. In the second embodiment, as illustrated in FIGS. 9 and 10, the virtual viewpoint E is set in the sky obliquely rearward of the left side of the vehicle 1. The viewpoint and gazing point change unit 36e changes the positions of the virtual viewpoint E and the gazing point T according to a change in the relative position between the vehicle 1 and the target position P (target area Pt) (according to the movement state of the vehicle 1 with respect to the target position P). In this case, the virtual viewpoint E and the gazing point T move according to the behavior of the vehicle 1 in a state where a certain relationship therebetween is maintained. That is, as indicated by an arrow F2 in FIGS. 9 and 10, the positions of the virtual viewpoint E and the gazing point T change according to the behavior of the vehicle 1 in a state where the distance between the virtual viewpoint E and the gazing point T is maintained and in a state where the heights of the virtual viewpoint E and the gazing point T are maintained. Then, as described with reference to FIG. 5, the virtual viewpoint image generation unit 36f sequentially generates virtual viewpoint images by projecting a captured image when the gazing point T is viewed from the virtual viewpoint E onto the virtual projection plane Sp.

FIG. 11 is a view illustrating the transition of the virtual viewpoint image 46A in a case where the own vehicle image 1A corresponding to the vehicle 1 moves toward the target position P (target area Pt) in a state where the distance between the virtual viewpoint E and the gazing point T is maintained and in a state where the heights of the virtual viewpoint E and the gazing point T are maintained. In the case of FIG. 11 as well, the virtual viewpoint image 46A and the bird's eye view image 46B are displayed side by side on the display device 8.

As illustrated in FIGS. 9 and 10, in the second embodiment as well, the virtual viewpoint E is set on the virtual cylinder 50A (first virtual circle 50) centered on the center position Cg of the vehicle 1. Then, the virtual viewpoint E moves parallel to the ground Gr according to the relative angle θ acquired by the relative angle acquisition unit 36b while looking down at the gazing point T which is set on the second virtual circle 52 centered on the center position Cg of the vehicle 1 at the same height (e.g., h=2 m) of the virtual cylinder 50A. That is, the angle at which the vehicle 1 is looked down from the virtual viewpoint E and the angle at which the three-dimensional object existing around the vehicle 1 (e.g., the other vehicle 48) is looked down from the virtual viewpoint E do not substantially change. As a result, even when the virtual viewpoint E moves in the circumferential direction on the virtual cylinder 50A as the vehicle 1 moves toward the target position P (target area Pt) (even when the gazing point T moves in the circumferential direction on the second virtual circle 52), as illustrated in FIG. 11, the vehicle 1 (own vehicle image 1A) and the other vehicle 48 existing in the vicinity appear to rotate on the ground Gr according to the position of the virtual viewpoint E. In this case, the size of the outer shape of the own vehicle image 1A does not substantially change. Further, as illustrated in FIG. 11, when the vehicle 1 (own vehicle image 1A) gradually approaches the target position P (target area Pt), the other vehicle 48 and the like existing in the vicinity enlarges and approaches according to the distance from the virtual viewpoint E, so that the shape thereof is prevented from unnaturally expanding or contracting or being distorted in the process of movement of the vehicle 1.

As described above, according to the periphery display control unit 30 (periphery display control device) of the present embodiment, when the virtual viewpoint image 46A is displayed, a change in the appearance (e.g., distortion or extension) of the three-dimensional object existing around the vehicle 1 (own vehicle image 1A) may be prevented. As a result, it is possible to avoid deterioration in the reality of the virtual viewpoint image 46A. Further, as in the second embodiment, by setting the gazing point T to a position closer to the target position P than the center position Cg of the vehicle 1, the vehicle 1 and the target position P (target area Pt) are easily included in the field of view from the virtual viewpoint E. As a result, display may be made to make it easy for the user to grasp a positional relationship between the vehicle 1 (own vehicle image 1A) and the target position P (target area Pt) in the process in which the vehicle 1 approaches the target position P (target area Pt) while preventing a change in the appearance (e.g., distortion or extension) of the surrounding three-dimensional object.

Third Embodiment

Figure 12:
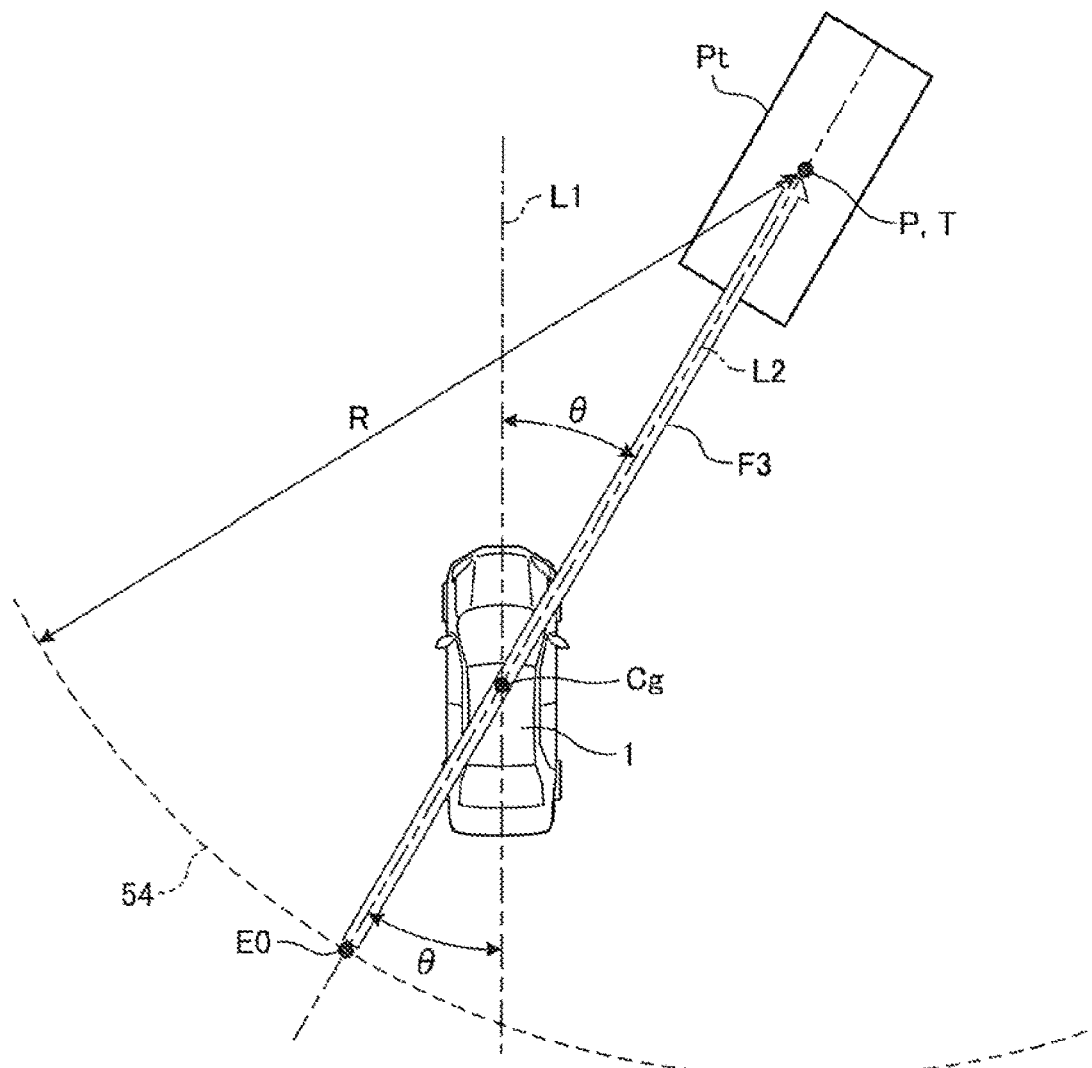
FIG. 12 is an exemplary and schematic bird's eye view for explaining a case where a virtual viewpoint is set on the outer peripheral surface of a virtual cylinder centered on a target position and a gazing point is set at the target position in a periphery display control device according to a third embodiment.
Figure 13:
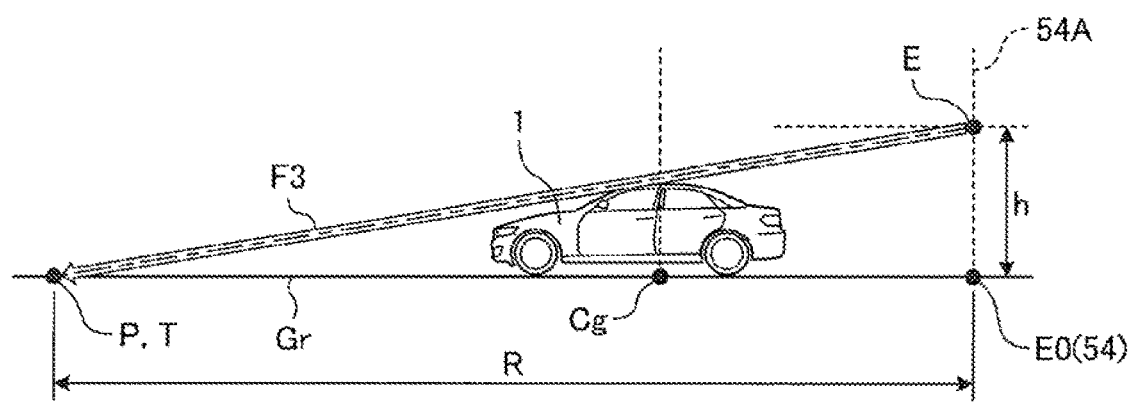
FIG. 13 is an exemplary and schematic side view for explaining the case where the virtual viewpoint is set on the outer peripheral surface of the virtual cylinder centered on the target position and the gazing point is set at the target position in a periphery display control device according to the third embodiment.
Figure 14:
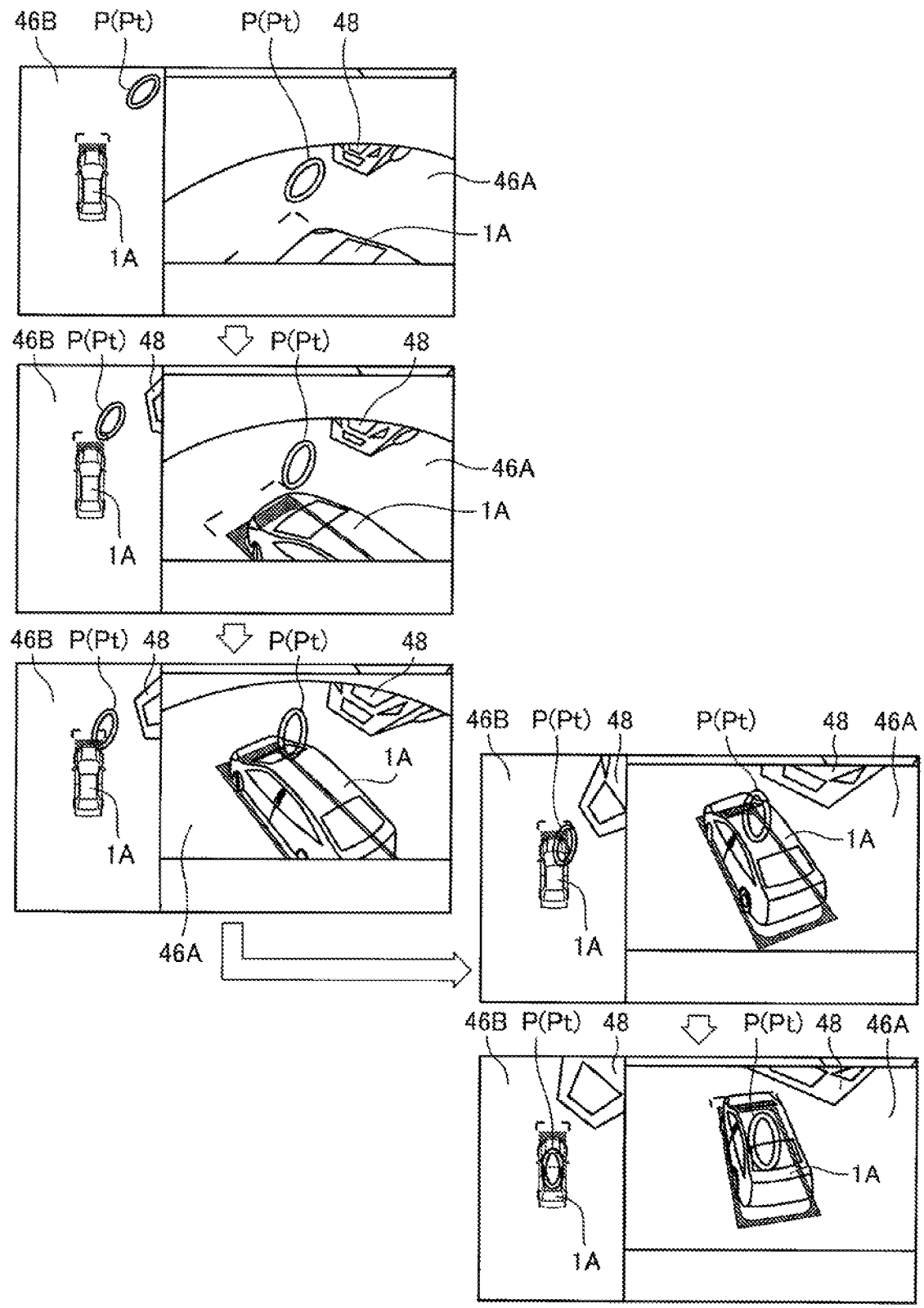
FIG. 14 is a view illustrating a schematic and exemplary display image in which a virtual viewpoint image that undergoes transition with the movement of the own vehicle and a bird's-eye view image are displayed in two-screen display when the virtual viewpoint and the gazing point are set as illustrated in FIGS. 12 and 13.

FIGS. 12 to 14 illustrate a case where the gazing point T is set, for example, at the target position P by the gazing point setting unit 36d and the virtual viewpoint E moves on a virtual cylinder centered on the target position P according to a third embodiment. That is, even when the vehicle 1 approaches the target position P, the virtual viewpoint E does not approach the target position P (target area Pt). In addition, in the third embodiment, the gazing point T is set, for example, to the same height as the ground Gr, but is not limited thereto. Further, in the third embodiment as well, similarly to the first and second embodiments, it is assumed that, at a time point when a display request for a virtual viewpoint image is made, the image acquisition unit 32 acquires a captured image around the vehicle 1 and the target acquisition unit 34 acquires (designates), for example, a position obliquely forward of the right side of the vehicle 1 as the target position P (target area Pt).

As in the first and second embodiments, when a display request for a virtual viewpoint image is made, the own vehicle position acquisition unit 36a sets the current position of the vehicle 1 (e.g., the center position Cg) at the origin position on the relative coordinate system, and acquires the set position as an own vehicle position. Subsequently, the relative angle acquisition unit 36b acquires, as the relative angle θ, the angle formed by the first direction line L1 that passes through the center position Cg of the vehicle 1 and extends in the vehicle length direction and the second direction line L2 that passes through the center position Cg and the target position P on the relative coordinate system. Then, the virtual viewpoint setting unit 36c sets the position of the virtual viewpoint E based on the relative angle θ acquired by the relative angle acquisition unit 36b. In the case of FIG. 12, the virtual viewpoint setting unit 36c sets, to the viewpoint direction reference point E0, the intersection position between the extension line of the second direction line L2 extending beyond the vehicle 1 and a virtual circle 54 having a radius R (e.g., R=10 m) centered on the target position P. Then, as illustrated in FIG. 13, the virtual viewpoint setting unit 36c moves the viewpoint direction reference point E0 on the outer peripheral surface of a virtual cylinder 54A in the height direction by the distance h (e.g., 2 m) and sets the virtual viewpoint E at the moved position. In the third embodiment, as illustrated in FIGS. 12 and 13, the virtual viewpoint E is set in the sky obliquely rearward of the left side of the vehicle 1. The viewpoint and gazing point change unit 36e may move the virtual viewpoint E in the circumferential direction of the virtual cylinder 54A according to a change in the relative position between the vehicle 1 and the target position P (target area Pt), but does not change the position of the gazing point T. That is, as indicated by an arrow F3 in FIGS. 12 and 13, the virtual viewpoint E moves on the circular orbit around the gazing point T in a state where the distance between the virtual viewpoint E and the gazing point T is maintained and in a state where the heights of the virtual viewpoint E and the gazing point T are maintained. As a result, the target position P (target area Pt) is continuously displayed on the virtual viewpoint image from the start of movement of the vehicle 1 (own vehicle image 1A) (e.g., the start of display of the virtual viewpoint image) to the completion of movement. Then, as described with reference to FIG. 5, the virtual viewpoint image generation unit 36f sequentially generates virtual viewpoint images by projecting a captured image when the gazing point T is viewed from the virtual viewpoint E onto the virtual projection plane Sp. In this case, the own vehicle image 1A is displayed in a small size so as to gradually move away as it approaches the target position P (target area Pt).

FIG. 14 is a view illustrating the transition of the virtual viewpoint image 46A in a case where the gazing point T and the target position P are set at the same position and the own vehicle image 1A corresponding to the vehicle 1 moves toward the target position P (target area Pt) in a state where the distance between the virtual viewpoint E and the gazing point T is maintained and in a state where the heights of the virtual viewpoint E and the gazing point T are maintained. In the case of FIG. 14 as well, the virtual viewpoint image 46A and the bird's eye view image 46B are displayed side by side on the display device 8.

As illustrated in FIGS. 12 and 13, in the third embodiment, the virtual viewpoint E is set on the virtual cylinder 54A (virtual circle 54) centered on the target position P. Then, the virtual viewpoint E may move parallel to the ground Gr in the circumferential direction on the virtual cylinder 54A according to the relative angle θ acquired by the relative angle acquisition unit 36b while looking down at the gazing point T which exists continuously at the same distance from the virtual viewpoint E at the same height (e.g., h=2 m) of the virtual cylinder 54A. In this case, since the distance from the virtual viewpoint E to the gazing point T is always constant, the angle at which the vehicle 1 is looked down from the virtual viewpoint E and the angle at which a three-dimensional object (e.g., the other vehicle 48) existing around the vehicle 1 is looked down from the virtual viewpoint E do not change substantially, respectively. As a result, even when the virtual viewpoint E moves in the circumferential direction on the virtual cylinder 54A as the vehicle 1 moves toward the target position P (target area Pt), as illustrated in FIG. 14, the vehicle 1 and the other vehicle 48 existing in the vicinity appear to rotate on the ground Gr according to the position of the virtual viewpoint E. In this case, the size of the outer shape appearance of the own vehicle image 1A gradually decreases as it approaches the target position P (target area Pt). Further, as illustrated in FIG. 14, when the vehicle 1 (own vehicle image 1A) gradually approaches the target position P (target area Pt), the other vehicle 48 existing in the vicinity changes in direction according to the position of the virtual viewpoint E, but the shape thereof is prevented from unnaturally expanding or contracting or being distorted in the process of movement of the vehicle 1.

As described above, according to the periphery display control unit 30 (periphery display control device) of the present embodiment, when the virtual viewpoint image 46A is displayed, a change in the appearance (e.g., distortion or extension) of the three-dimensional object existing around the vehicle 1 (own vehicle image 1A) may be prevented. As a result, it is possible to avoid deterioration in the reality of the virtual viewpoint image 46A. Further, as in the third embodiment, by setting the virtual viewpoint E on the virtual cylinder 54A centered on the gazing point T that is set at the target position P, the target position P (target area Pt) may be continuously displayed on the virtual viewpoint image 46A. As a result, display may be made to make it easy for the user to recognize the target position P (target area Pt) as if the target position P is continuously displayed at substantially the same position in the process in which the vehicle 1 approaches the target position P (target area Pt) while preventing a change in the appearance (e.g., distortion or extension) of the surrounding three-dimensional object.

Comparative Example

FIGS. 15 to 17 illustrate, as a comparative example, a case where the gazing point T is set at the target position P and the virtual viewpoint E is set on a virtual cylinder 64A (virtual circle 64) centered on the center position Cg of the vehicle 1. In this comparative example as well, it is assumed that, at a time point when a display request for a virtual viewpoint image is made, a captured image around the vehicle 1 is acquired and, for example, a position obliquely forward of the right side of the vehicle 1 is designated as the target position P (target area Pt).

In the comparative example as well, when a display request for a virtual viewpoint image is made, the current position of the vehicle 1 (e.g., the center position Cg) is set at the origin position on the relative coordinate system, and the set position is an own vehicle position. Subsequently, the angle formed by the first direction line L1 that passes through the center position Cg of the vehicle 1 and extends in the vehicle length direction and the second direction line L2 that passes through the center position Cg and the target position P on the relative coordinate system is the relative angle θ. Then, with regard to the virtual viewpoint E, the intersection position between the extension line of the second direction line L2 extending beyond the vehicle 1 and the virtual circle 64 of the radius r (e.g., r=4 m) centered on the center position Cg of the vehicle 1 is set to the viewpoint direction reference point E0. Then, as illustrated in FIG. 16, the virtual viewpoint E is set at the position to which the viewpoint direction reference point E0 moves on the outer peripheral surface of the virtual cylinder 64A in the height direction by the distance h (e.g., 2 m). In the comparative example, as illustrated in FIGS. 15 and 16, the virtual viewpoint E is set in the sky obliquely rearward of the left side of the vehicle 1. In the comparative example, the virtual viewpoint E approaches the target position P (gazing point T) while moving in the circumferential direction on the virtual cylinder 64A as the vehicle 1 moves. Thus, when the distance between the virtual viewpoint E and the gazing point T gradually decreases and the vehicle 1 has reached the target position P, the virtual viewpoint E looks down at the gazing point T from directly above like bird's eyes. That is, as indicated by an arrow F4 in FIGS. 15 and 16, the distance between the virtual viewpoint E and the gazing point T becomes shorter as the vehicle 1 moves (approaches to the target position P). Then, when captured images when the gazing point T is viewed from the virtual viewpoint E are sequentially projected onto the virtual projection plane Sp, the angle at which the vehicle 1 is looked down from the virtual viewpoint E or the angle at which a three-dimensional object existing around the vehicle 1 (e.g., the other vehicle 48) is looked down from the virtual viewpoint E changes. As a result, as illustrated in FIG. 17, the appearance (e.g., distortion or extension) of the three-dimensional object such as the other vehicle 48 existing around the own vehicle image 1A changes. For example, the reality of the virtual viewpoint image 46A deteriorates as the other vehicle 48 gradually enlarges and extends. As a result, it may be difficult to grasp the distance to the three-dimensional object such as the other vehicle 48 or the shape of the three-dimensional object, or the three-dimensional object may appear to move due to enlargement or extension of the display although it is a stationary object. Further, since the vehicle 1 is displayed as a bird's eye view when the vehicle 1 (own vehicle image 1A) has reached the target position P, the virtual viewpoint image 46A and the bird's eye view image 46B have substantially the same display content and the meaning of two-screen display declines.

As described above, in the comparative example in which the distance between the virtual viewpoint E and the gazing point T is not maintained, the reality of the virtual viewpoint image 46A is deteriorated and the quality of display is deteriorated. Meanwhile, in the first to third embodiments in which a virtual viewpoint image is generated in a state where the distance between the virtual viewpoint E and the gazing point T is maintained, it is possible to avoid deterioration in the reality of the virtual viewpoint image 46A. Further, when two-screen display is performed, highly realistic display by the display of the virtual viewpoint image 46A and display that makes it easy to grasp a positional relationship with a surrounding object depending on the display of the bird's eye view image 46B may be provided to the user in a balanced manner.

In addition, FIGS. 8, 11, and 14 illustrate an example in which the virtual viewpoint image 46A and the bird's eye view image 46B are displayed side by side on two screens, but only the virtual viewpoint image 46A may be displayed, and a highly realistic display may be provided when the vehicle 1 moves with respect to the target position P.

FIG. 18 is a view for explaining a display example of the virtual viewpoint image 46A before and after the vehicle 1 (own vehicle image 1A) reaches the target position P (target area Pt). As described above, the viewpoint and gazing point change unit 36e of the present embodiment maintains the virtual viewpoint E at a predetermined height (e.g., h=2 m) when the vehicle 1 is moving. That is, the look-down angle when looking down the vehicle 1 from the virtual viewpoint E does not change. Therefore, it may be difficult to determine whether or not the vehicle 1 (own vehicle image 1A) has reached the target position P (target area Pt). Thus, the viewpoint and gazing point change unit 36e changes the height of the virtual viewpoint E when the vehicle 1 completes movement to the target position P. For example, the position of the virtual viewpoint E is moved downward on the virtual cylindrical surface. As a result, the elevation angle of the virtual viewpoint E with respect to the vehicle 1 becomes shallow, and the behavior of the own vehicle image 1A displayed on the virtual viewpoint image 46A shows an aspect different from the aspect so far of rotating along the ground Gr. For example, an image that faces the own vehicle image 1A from a lower position than before is obtained. That is, display that views the front surface (rear surface or side surface) from the front is made. Thus, display may be made to make it easy for the user to understand that the vehicle 1 has reached the target position P. In addition, the viewpoint and gazing point change unit 36e may only need to cause the own vehicle image 1A that has reached the target position P to show a behavior different from that so far, and for example, may cause the position of the virtual viewpoint E to move upward on the virtual cylindrical surface, and display may be made to make it easy for the user to understand that the vehicle 1 has reached the target position P. Further, when the vehicle 1 has reached the target position P (e.g., when parking is completed), the viewpoint and gazing point change unit 36e may cause the virtual viewpoint E to move around the vehicle 1 (e.g., make a round at the same height). In this case, display may be made to make it easy for the user to further understand that the vehicle 1 has reached the target position P.

<Image Display Processing Flow>

An example of the flow of an image display processing by the periphery display control device (periphery display control unit 30) configured as described above will be described with reference to the flowchart of FIG. 19. In addition, the flowchart of FIG. 19 is repeatedly executed at a predetermined processing cycle, for example, when the vehicle 1 is powered on.

First, the periphery display control unit 30 confirms whether or not the user has requested the display of the virtual viewpoint image 46A by operating the operation input unit 10 and the like (S100). When there is no request (No in S100), this flow is once terminated. Meanwhile, when the periphery display control unit 30 confirms a display request for the virtual viewpoint image 46A (Yes in S100), the image acquisition unit 32 acquires captured image data (captured image) around the vehicle 1 imaged by each imaging unit 15 (S102). Subsequently, the image generation unit 36 generates the bird's eye view image 46B that displays the surroundings of the vehicle 1 using the current captured image data (captured image) acquired by the image acquisition unit 32, and the output unit 38 outputs and displays the bird's eye view image 46B on the display device 8 via the display controller 14d (S104). In addition, in this case, since the bird's eye view image 46B is mainly used to set the target position P, the bird's eye view image 46B may be displayed on the display device 8 in full screen, or other table images may be displayed side by side.

The own vehicle position acquisition unit 36a sets, for example, the center position Cg of the vehicle 1 at the origin on the relative coordinate system, and uses the set position as an own vehicle position (S106). Subsequently, when the target position P (target area Pt) has not been determined (No in S108), the target acquisition unit 34 provides the user with, for example, a voice guide output from the voice output device 9 or a guide message displayed on the bird's eye view image 46B, designates the target position P via the operation input unit 10 and like, and acquires relative position data of the target position P (S110). In addition, in S108, when the target position P (target area Pt) has already been set (Yes in S108), the processing of S110 is skipped.

Subsequently, as described with reference to FIG. 6 and the like, the relative angle acquisition unit 36b acquires, as the relative angle θ, the angle formed by the first direction line L1 that passes through the center position Cg of the vehicle 1 and extends in the vehicle length direction (longitudinal direction) and the second direction line L2 that passes through the center position Cg and the target position P on the relative coordinate system (S112). Then, as described with reference to FIG. 6 and the like, the virtual viewpoint setting unit 36c first acquires the viewpoint direction reference point E0 using the virtual circle 44. Then, the virtual viewpoint setting unit 36c sets the position of the virtual viewpoint E by moving the viewpoint direction reference point E0 in the height direction by the distance h on the outer peripheral surface of the virtual cylinder 44A that rises perpendicularly to the ground Gr from the virtual circle 44 as the bottom surface (S114). Subsequently, the gazing point setting unit 36d sets the gazing point T so as to face an area including at least one of the vehicle 1 or the target position P (S116). For example, the gazing point T may be set at the center position Cg of the vehicle 1 as illustrated in FIG. 6, may be set on the second virtual circle 52 as illustrated in FIG. 9, or may be set at the target position P as illustrated in FIG. 12. As described in the first to third embodiments, the display content of the virtual viewpoint image 46A differs according to the position of the gazing point T. Accordingly, the gazing point T may be appropriately selected by the user using the operation input unit 10 and the like, or may be set as a default in advance by the gazing point setting unit 36d.

When the virtual viewpoint E and the gazing point T are set, as described in FIG. 5, the virtual viewpoint image generation unit 36f generates the virtual viewpoint image 46A by projecting the captured image data (captured images) acquired by the image acquisition unit 32 onto the virtual projection plane Sp according to the position of the virtual viewpoint E and the position of the gazing point T, and the output unit 38 outputs and displays the virtual viewpoint image 46A on the display device 8 via the display controller 14d (S118). Then, the own vehicle position acquisition unit 36a determines whether or not the vehicle 1 has reached the target position P, and when the vehicle 1 has not been reached (No in S120), the flow proceeds to S102 and the processing after S102 is repeatedly executed. When the vehicle 1 has moved relative to the target position P during this time, the viewpoint and gazing point change unit 36e changes the position of the virtual viewpoint E or the position of the gazing point T, and the virtual viewpoint image generation unit 36f sequentially generates the virtual viewpoint image 46A depending on the behavior of the vehicle 1, updates the display content of the display device 8, and executes display as illustrated in FIGS. 8, 11, 14, and the like.

In S120, when the own vehicle position acquisition unit 36a determines that the vehicle 1 has reached the target position P (Yes in S120), the viewpoint and gazing point change unit 36e changes the height of the virtual viewpoint E (S122). For example, as illustrated in FIG. 18, the position of the virtual viewpoint E is moved downward on the virtual cylindrical surface to make the elevation angle of the virtual viewpoint E with respect to the vehicle 1 shallow. As a result, the own vehicle image 1A displayed on the virtual viewpoint image 46A is an image that faces from a lower position than before, and display is made to make it easy for the user to understand that the vehicle 1 has reached the target position P. Then, this flow is terminated.

In addition, the display of the virtual viewpoint image 46A may be executed when the vehicle 1 travels (moves) by automatically executing all driving operations such as an accelerator operation, a brake operation, and a steering operation under the control of a traveling assistance device or a parking assistance device. Alternatively, the display of the virtual viewpoint image 46A may be executed when the vehicle 1 travels (moves) by semi-automatic control in which only some of the driving operations are automatically controlled and the remaining driving operations are entrusted to the driver. Further, the display of the virtual viewpoint image 46A may be executed when the vehicle 1 travels (moves) by manual driving in which the driver performs a driving operation by only an operation instruction du to voice, display message, and the like, or by a driving operation depending on the drivers intention without an operation instruction.

As described above, according to the periphery display control device of the embodiment, when the process in which the vehicle 1 moves to the target position P is displayed with the virtual viewpoint image 46A, it is possible to provide display with reduced discomfort that is easy to recognize while avoiding deterioration in reality.

In addition, the position of the virtual viewpoint E or the position of the gazing point T in each embodiment described above is an example. Thus, at least one of the position of the virtual viewpoint E and the position of the gazing point T may be changed in a state where the distance from the virtual viewpoint E to the gazing point T is maintained and the heights of the virtual viewpoint E and the gazing point T are maintained, and the same effect as in the present embodiment may be obtained even if the positions of the virtual viewpoint E and the gazing point T are appropriately changed.

A program for the periphery display processing executed by the CPU 14a of the embodiment may be a file in an installable or executable format, and may be configured to be recorded on a computer readable recording medium such as a CD-ROM, a flexible disk (FD), a CD-R, or a digital versatile disk (DVD).

Moreover, the periphery display processing program may be stored in a computer connected to a network such as the Internet and may be configured so as to be provided by being downloaded via the network. Further, the periphery display processing program executed in the embodiment may be configured so as to be provided or distributed via a network such as the Internet.

A periphery display control device according to an aspect of this disclosure includes, for example, an image acquisition unit configured to acquire captured image data obtained by imaging a periphery of an own vehicle, a target acquisition unit configured to acquire a target position to which the own vehicle moves, an image generation unit configured to generate a virtual viewpoint image while moving, based on a relative angle of the target position with respect to a movement direction of the own vehicle when the own vehicle moves to the target position, at least one of a virtual viewpoint that is set at a position facing the target position across the own vehicle and a gazing point when facing an area including at least one of the own vehicle and the target position from the virtual viewpoint in a state where a distance between the virtual viewpoint and the gazing point is maintained and heights of the virtual viewpoint and the gazing point are maintained, and an output unit configured to output the virtual viewpoint image to a display device. According to this configuration, for example, the distance between the virtual viewpoint and the gazing point does not change and the heights of the virtual viewpoint and the gazing point do not change. As a result, even when the own vehicle moves toward the target position, the virtual viewpoint image moves parallel to the road surface and the angle at which the target position or a surrounding three-dimensional object is looked down from the virtual viewpoint does not change. In other words, a change in the appearance (e.g., distortion or extension) of the surrounding three-dimensional object may be prevented and deterioration in the reality of the virtual viewpoint image may be avoided.

In the periphery display control device according to the aspect of this disclosure, for example, the image generation unit may set the virtual viewpoint on an outer peripheral surface of a virtual cylinder that is set around the own vehicle and may set the gazing point at a position corresponding to a vehicle center of the own vehicle. According to this configuration, for example, since the gazing point is set at the position corresponding to the vehicle center, the own vehicle may be continuously displayed near the center of the virtual viewpoint image. As a result, display may be made to make it easy to grasp the behavior of the own vehicle approaching the target position while preventing a change in the appearance (e.g., distortion or extension) of the surrounding three-dimensional object.

In the periphery display control device according to the aspect of this disclosure, for example, the image generation unit may set the virtual viewpoint and the gazing point on an outer peripheral surface of a virtual cylinder that is set around the own vehicle. In this case, the virtual viewpoint and the gazing point may be set on the same virtual circle (cylinder) or may be set on different virtual circles (cylinders). According to this configuration, for example, the gazing point is set farther than the own vehicle, and the own vehicle and the target position are easily included in the field of view from the virtual viewpoint. As a result, display may be made to make it easier to grasp a positional relationship between the own vehicle and the target position in the process in which the own vehicle approaches the target position while preventing a change in the appearance (e.g., distortion or extension) of the surrounding three-dimensional object.

In the periphery display control device according to the aspect of this disclosure, for example, the image generation unit may set the virtual viewpoint on an outer peripheral surface of a virtual cylinder centered on the target position and may set the gazing point at the target position. According to this configuration, for example, the target position may be continuously displayed on the virtual viewpoint image. As a result, display may be made to make it easy to recognize the target position since the target position is continuously displayed at substantially the same position in the process in which the own vehicle approaches the target position while preventing a change in the appearance (e.g., distortion or extension) of the surrounding three-dimensional object.

In the periphery display control device according to the aspect of this disclosure, for example, the image generation unit may change the height of the virtual viewpoint when the own vehicle completes movement to the target position. According to this configuration, for example, display may be made to make it easy for a user to easily understand that the own vehicle has reached the target position.

Although the embodiments and modifications disclosed here have been exemplified above, the above-described embodiments and modifications thereof are merely given by way of example, and are not intended to limit the scope of this disclosure. Such novel embodiments and modifications may be implemented in various other modes, and various omissions, substitutions, combinations, and changes thereof may be made without departing from the gist of this disclosure. In addition, the embodiments and modifications may be included in the scope and gist of this disclosure and are included in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery display control device comprising:

at least one processor configured to implement:

an image acquisition unit configured to acquire captured image data obtained by imaging a periphery of an own vehicle;

a target acquisition unit configured to acquire a target position to which the own vehicle moves; an image generation unit configured to generate a virtual viewpoint image while moving, based on a relative angle of the target position with respect to a movement direction of the own vehicle when the own vehicle moves to the target position, at least one of a virtual viewpoint set at a position facing the target position across the own vehicle and a gazing point when facing an area including at least one of the own vehicle and the target position from the virtual viewpoint in a state where a distance between the virtual viewpoint and the gazing point is maintained and heights of the virtual viewpoint and the gazing point are maintained; and an output unit configured to output the virtual viewpoint image to a display device, wherein the image generation unit sets the virtual viewpoint and the gazing point on an outer peripheral surface of a virtual cylinder set around the own vehicle.

2. The periphery display control device according to claim 1, wherein
the image generation unit sets the virtual viewpoint on an outer peripheral surface of a virtual cylinder set around the own vehicle and sets the gazing point at a position corresponding to a vehicle center of the own vehicle.

3. The periphery display control device according to claim 2, wherein
the image generation unit changes the height of the virtual viewpoint when the own vehicle completes movement to the target position.

4. The periphery display control device according to claim 1, wherein
the image generation unit sets the virtual viewpoint on an outer peripheral surface of a virtual cylinder centered on the target position and sets the gazing point at the target position.

5. The periphery display control device according to claim 4, wherein
the image generation unit changes the height of the virtual viewpoint when the own vehicle completes movement to the target position.

6. The periphery display control device according to claim 1, wherein
the image generation unit changes the height of the virtual viewpoint when the own vehicle completes movement to the target position.

* * * * *